(12) United States Patent
Fujita et al.

(10) Patent No.: US 11,256,129 B2
(45) Date of Patent: Feb. 22, 2022

(54) IN-CELL LIQUID CRYSTAL PANEL AND LIQUID CRYSTAL DISPLAY DEVICE

(71) Applicant: NITTO DENKO CORPORATION, Ibaraki (JP)

(72) Inventors: Masakuni Fujita, Ibaraki (JP); Satoshi Yamamoto, Ibaraki (JP); Yusuke Toyama, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/499,019

(22) PCT Filed: Mar. 28, 2018

(86) PCT No.: PCT/JP2018/012775
§ 371 (c)(1),
(2) Date: Sep. 27, 2019

(87) PCT Pub. No.: WO2018/181479
PCT Pub. Date: Oct. 4, 2018

(65) Prior Publication Data
US 2020/0033674 A1    Jan. 30, 2020

(30) Foreign Application Priority Data

Mar. 28, 2017    (JP) .............................. JP2017-062166

(51) Int. Cl.
*G02F 1/1335* (2006.01)
*C09J 133/08* (2006.01)
(Continued)

(52) U.S. Cl.
CPC ...... *G02F 1/133528* (2013.01); *C09J 133/08* (2013.01); *G06F 3/044* (2013.01);
(Continued)

(58) Field of Classification Search
None
See application file for complete search history.

(56) References Cited

U.S. PATENT DOCUMENTS

| 8,692,948 B2 | 4/2014 | Park et al. |
| 10,775,923 B2 | 9/2020 | Kurasawa et al. |

(Continued)

FOREIGN PATENT DOCUMENTS

| CN | 101018839 A | 8/2007 |
| CN | 101040196 A | 9/2007 |

(Continued)

OTHER PUBLICATIONS

Office Action dated Dec. 25, 2019, issued in counterpart JP application No. 2019-509976, with English translation. (10 pages).

(Continued)

*Primary Examiner* — Ryan Crockett
(74) *Attorney, Agent, or Firm* — Westerman, Hattori, Daniels & Adrian, LLP

(57) ABSTRACT

An in-cell type liquid crystal panel is disclosed including an in-cell type liquid crystal cell provided with a liquid crystal layer, a first transparent substrate and a second transparent substrate sandwiching the liquid crystal layer, and a touch sensing electrode unit related to a touch sensor and a touch-driven function between the first transparent substrate and the second transparent substrate and a pressure-sensitive adhesive layer attached polarizing film disposed, via a first adhesive layer and without interposing a conductive layer, to the first transparent substrate side on a viewing side of the in-cell type liquid crystal cell. The pressure-sensitive adhesive layer attached polarizing film comprises a surface treatment layer, a first polarizing film, and a first pressure-sensitive adhesive layer in this order, or comprises the surface treatment layer, the first polarizing film, an anchor (Continued)

layer, and the first pressure-sensitive adhesive layer in this order.

11 Claims, 3 Drawing Sheets

(51) Int. Cl.
| | | |
|---|---|---|
| *G06F 3/041* | (2006.01) | |
| *G06F 3/044* | (2006.01) | |
| *G02F 1/1333* | (2006.01) | |

(52) U.S. Cl.
CPC ........ *G06F 3/0412* (2013.01); *G02F 1/13338* (2013.01); *G02F 1/133562* (2021.01); *G02F 2202/22* (2013.01); *G02F 2202/28* (2013.01)

(56) References Cited

U.S. PATENT DOCUMENTS

| | | | |
|---|---|---|---|
| 2006/0279923 | A1 | 12/2006 | Kim et al. |
| 2008/0118752 | A1 | 5/2008 | Inoue et al. |
| 2009/0017298 | A1 | 1/2009 | Okada et al. |
| 2010/0028564 | A1 | 2/2010 | Cheng et al. |
| 2010/0182273 | A1 | 7/2010 | Noguchi et al. |
| 2011/0181813 | A1 | 7/2011 | Kim et al. |
| 2011/0285640 | A1* | 11/2011 | Park ..................... G06F 3/0412 345/173 |
| 2011/0310333 | A1 | 12/2011 | Kim et al. |
| 2012/0062511 | A1 | 3/2012 | Ishizaki et al. |
| 2012/0300299 | A1 | 11/2012 | Yasui et al. |
| 2013/0044074 | A1* | 2/2013 | Park ..................... G02F 1/1362 345/174 |
| 2013/0120314 | A1* | 5/2013 | Ishibashi ............... G06F 3/0412 345/174 |
| 2013/0271832 | A1 | 10/2013 | Youki et al. |
| 2013/0330550 | A1 | 12/2013 | Toyama et al. |
| 2013/0335942 | A1 | 12/2013 | Kuriyama et al. |
| 2014/0085722 | A1 | 3/2014 | Yasui et al. |
| 2014/0104510 | A1 | 4/2014 | Wang et al. |
| 2014/0255689 | A1 | 9/2014 | Yasui et al. |
| 2014/0322457 | A1 | 10/2014 | Yasui et al. |
| 2015/0293287 | A1 | 10/2015 | Yasui et al. |
| 2015/0301385 | A1* | 10/2015 | Tsunekawa ......... G02F 1/13363 349/12 |
| 2015/0353787 | A1 | 12/2015 | Nagata et al. |
| 2015/0368525 | A1 | 12/2015 | Yasui et al. |
| 2016/0062510 | A1 | 3/2016 | Tomohisa et al. |
| 2016/0084995 | A1 | 3/2016 | Kitagawa |
| 2016/0085007 | A1 | 3/2016 | Akizuki et al. |
| 2016/0130478 | A1 | 5/2016 | Nagata et al. |
| 2016/0152843 | A1 | 6/2016 | Hwang et al. |
| 2016/0185083 | A1 | 6/2016 | Yasui et al. |
| 2016/0195645 | A1 | 7/2016 | Yasui et al. |
| 2016/0349413 | A1* | 12/2016 | Nakata ................. G02B 5/3033 |
| 2016/0357079 | A1 | 12/2016 | Chen et al. |
| 2017/0022396 | A1 | 1/2017 | Kimura et al. |
| 2017/0059756 | A1 | 3/2017 | Yoo et al. |
| 2017/0121565 | A1 | 5/2017 | Yasui et al. |
| 2018/0039145 | A1 | 2/2018 | Liao et al. |
| 2018/0157111 | A1 | 6/2018 | Ueki et al. |
| 2018/0157125 | A1 | 6/2018 | Yasui et al. |
| 2018/0356565 | A1* | 12/2018 | Tsuburaya ............. G02B 1/16 |
| 2020/0033673 | A1* | 1/2020 | Fujita ................. G02F 1/133528 |
| 2021/0103173 | A1* | 4/2021 | Fujita ..................... G06F 3/0412 |

FOREIGN PATENT DOCUMENTS

| | | |
|---|---|---|
| CN | 101681221 A | 3/2010 |
| CN | 10299732 A | 6/2011 |
| CN | 102099716 A | 6/2011 |
| CN | 102112900 A | 6/2011 |
| CN | 103483987 A | 1/2014 |
| CN | 103562760 A | 2/2014 |
| CN | 104737045 A | 6/2015 |
| CN | 104781363 A | 7/2015 |
| CN | 104861891 A | 8/2015 |
| CN | 105103016 A | 11/2015 |
| CN | 105319636 A | 2/2016 |
| CN | 105339816 A | 2/2016 |
| CN | 105738998 A | 7/2016 |
| CN | 106133096 A | 11/2016 |
| CN | 106133813 A | 11/2016 |
| CN | 106199807 A | 12/2016 |
| JP | 2001-235625 A | 8/2001 |
| JP | 2007-1108220 A | 4/2007 |
| JP | 2008-517138 A | 5/2008 |
| JP | 2008-203861 A | 9/2008 |
| JP | 2009-35722 A | 2/2009 |
| JP | 2009-229521 A | 10/2009 |
| JP | 2009-237489 A | 10/2009 |
| JP | 2009-242786 A | 10/2009 |
| JP | 2011-528447 A | 11/2011 |
| JP | 2011-252948 A | 12/2011 |
| JP | 2012-63839 A | 3/2012 |
| JP | 2012-247574 A | 12/2012 |
| JP | 2013-105154 A | 5/2013 |
| JP | 2013-253202 A | 12/2013 |
| JP | 2014-81935 A | 5/2014 |
| JP | 2014-112184 A | 6/2014 |
| JP | 2014-141647 A | 8/2014 |
| JP | 2015-108098 A | 6/2015 |
| JP | 2015-199942 A | 11/2015 |
| JP | 2016-102148 A | 6/2016 |
| JP | 2016-107498 A | 6/2016 |
| JP | 2016-130747 A | 7/2016 |
| JP | 2016-148724 A | 8/2016 |
| JP | 2016-224182 A | 12/2016 |
| JP | 2016-224307 A | 12/2016 |
| JP | 2017-003906 A | 1/2017 |
| JP | 2017068022 A | 4/2017 |
| JP | 6636596 B2 | 1/2020 |
| KR | 10-2009-0027930 A | 3/2009 |
| KR | 10-2013-0054137 A | 5/2013 |
| KR | 10-2015-0051937 A | 5/2015 |
| KR | 10-2016-0034219 A | 3/2016 |
| KR | 10-2016-0141750 A | 12/2016 |
| TW | 201001010 A | 1/2010 |
| TW | 201115219 A | 5/2011 |
| TW | 201222357 A | 6/2012 |
| TW | 201333136 A | 8/2013 |
| TW | 201345991 A | 11/2013 |
| TW | 201402725 A | 1/2014 |
| TW | 201432003 A | 8/2014 |
| TW | 201542736 A | 11/2015 |
| TW | 201614284 A | 4/2016 |
| TW | 201700690 A | 1/2017 |
| TW | 201707979 A | 3/2017 |
| WO | 2006/132500 A1 | 12/2006 |
| WO | 2009/119664 A1 | 10/2009 |
| WO | 2012/039279 A1 | 3/2012 |
| WO | 2014/208695 A1 | 12/2014 |
| WO | 2015/152201 A1 | 10/2015 |
| WO | 2016/158513 A1 | 10/2016 |
| WO | 2016/208716 A1 | 12/2016 |
| WO | 2017/014225 A1 | 1/2017 |

OTHER PUBLICATIONS

Office Action dated May 19, 2020, issued in counterpart JP Application No. 2019-509976, with English translation (11 pages).
Office Action dated Mar. 12, 2020, issued in counterpart JP Application No. 2019-509976, with English translation (30 pages).
Office Action dated Mar. 20, 2020, issued in counterpart KR Application No. 10-2019-7027779, with English translation (9 pages).
International Search Report dated Jun. 19, 2018, issued in counterpart International Application No. PCT/JP2018/012775 (2 pages).
Notice of Reasons for Refusal dated Jun. 17, 2019, issued in counterpart JP application No. 2019-509976, with English translation (12 pages).

(56) References Cited

OTHER PUBLICATIONS

Official Letter and Search Report dated Dec. 26, 2018, issued in counterpart TW application No. 107110681, with English translation (11 pages).
Notification of Transmittal of Translation of the International Preliminary Report on Patentability (Form PCT/IB/338) issued in counterpart International Application No. PCT/JP2018/012775 dated Oct. 10, 2019 with Forms PCT/IB/373 and PCT/ISA/237. (7 pages).
Office Action dated Aug. 24, 2020, issued in counterpart KR Application No. 10-2019-7027779, with English translation (7 pages).
Office Action dated Dec. 22, 2020, issued in counterpart KR Application No. 10-2019-7027779, with English translation (9 pages).
International Search Report dated Jun. 19, 2018, issued in International Application No. PCT/JP2018/012770 (counterpart to U.S. Appl. No. 16/498,708) (2 pages).
Official Letter and Search Report dated Dec. 25, 2018, issued in TW application No. 16/498,708 (counterpart to U.S. Appl. No. 16/498,708), with English translation. (11 pages).
Notice of Reasons for Refusal dated Jun. 5, 2019, issued in JP application No. 2018-207448 (counterpart to U.S. Appl. No. 16/498,708), with English translation. (6 pages).
Notification of Transmital of Translation of the International Preliminary Report on Patentability (Form PCT/IB/338) issued in International Application No. PCT/JP2018/012770 (counterpart to U.S. Appl. No. 16/498,708) dated Oct. 10, 2019 with Forms PCT/IB/373 and PCT/ISA/237. (6 pages).
Office Action dated Mar. 11, 2020, issued in JP Application No. 2018-549279 (counterpart to U.S. Appl. No. 16/498,708), with English translation. (7 pages).
Notice of Reasons for Refusal dated Sep. 22, 2020, issued in KR Application No. 10-2020-7019876 (counterpart to U.S. Appl. No. 16/498,708), with English translation. (8 pages).
Office Action in Chinese dated Oct. 22, 2020, issued in CN Patent Application No. 16/498,708.3 (counterpart to U.S. Appl. No. 16/498,708). (7 pages).
Search Report dated Oct. 13, 2020, issued in CN Patent Application No. 201880021944.3 (counterpart to U.S. Appl. No. 16/498,708), with English translation (3 pages).
Office Action dated Jan. 5, 2021, issued in CN Application No. 202010673243.7 (counterpart to U.S. Appl. No. 16/498,708), with English translation (14 pages).
Office Action dated Mar. 2, 2021, issued in TW Application No. 108130485 (counterpart to U.S. Appl. No. 16/498,708), with English translation (9 pages).
Office Action dated Nov. 30, 2018, issued in TW Application No. 107110677 (counterpart to U.S. Appl. No. 16/497,903), with English translation. (11pages).
International Search Report dated Jun. 19, 2018, issued in application No. PCT/JP2018/012630 (counterpart to U.S. Appl. No. 16/497,903). (2 pages).
Notification of Transmittal of Copies of Translation of the International Preliminary Report on Patentabililty (Form PCT/IB/338) issued in International Application No. PCT/JP2018/012630 (counterpart to U.S. Appl. No. 16/497,903) dated Oct. 10, 2019 with Forms PCT/IB/373 and PCT/ISA/237. (10 pages).
Office Action dated May 29, 2020, issued in JP application No. 2019-509939 (counterpart to U.S. Appl. No. 16/497,903), with English translation. (8 pages).
Office Action dated Aug. 31, 2020, issued in KR Application No. 10-2019-7031218 (counterpart to U.S. Appl. No. 16/497,903), with English translation. (8 pages).
Office Action dated Dec. 9, 2020, issued in TW Application No. 108118245 (counterpart to U.S. Appl. No. 16/497,903), with English translation. (11 pages).
Office Action dated Mar. 18, 2021, issued in CN Application No. 20188021984.8 (counterpart to U.S. Appl. No. 16/497,903), with English translation. (25 pages).
Office Action dated May 24, 2021, issued in KR application No. 10-2020-7019876 (counterpart to U.S. Appl. No. 16/498,708), with English translation. (6 pages).
Non-Final Office Action dated Apr. 13, 2021, issued in U.S. Appl. No. 16/498,708. (34 pages).
Non-Final Office Action dated Dec. 28, 2020, issued in U.S. Appl. No. 16/497,903. (35 pages).
International Search Report dated Jun. 19, 2018, issued in International Application No. PCT/JP2018/012808 (counterpart to U.S. Appl. No. 16/498,251) (2 page).
Notice of Reasons for Refusal dated Jul. 31, 2019, issued in JP Application No. 2019-509989 (counterpart to U.S. Appl. No. 16/498,251), with English translation (10 pages).
Notification of Transmillal of Copies of Translation of the International Preliminary Report on Patentabililty (Form PCT/IB/338) issued in International Application No. PCT/JP2018/012808 (counterpart to U.S. Appl. No. 16/498,251) dated Oct. 10, 2019 with Forms PCT/IB/373 and PCT/ISA/237 (9 pages).
Office Action dated Oct. 15, 2019, issued in TW Application No. 107110679 (counterpart to U.S. Appl. No. 16/498,251), with English translation. (13 pages).
Office Action dated Jan. 22, 2020, issued in JP Application No. 2019-509989 (counterpart to U.S. Appl. No. 16/498,251), with English translation. (9 pages).
Office Action dated Apr. 3, 2020, issued in JP Application No. 2019-509989 (counterpart to U.S. Appl. No. 16/498,251), with English translation. (10 pages).
Office Action dated Aug. 27, 2020, issued in JP Application No. 2020-119256 (counterpart to U.S. Appl. No. 16/498,251), with English translation. (10 pages).
Non-Final Office Action dated Oct. 14, 2020, issued in U.S. Appl. No. 16/498,251. (26 pages).
Final Office Action dated Jul. 20, 2021, issued in U.S. Appl. No. 16/497,903. (19 pages).
Office Action dated Jun. 7, 2021, issued in KR application No. 10-2019-7027066 (counterpart to U.S. Appl. No. 16/498,251), with English translation. (8 pages).
Taiwanese Search Report dated May 26, 2021, issued in counterpart TW application No. 108130846, with English translation. (2 pages).
Office Action dated Apr. 7, 2021, issued in CN Application No. 201880021947.7 (counterpart to U.S. Appl. No. 16/498,251), with English translation. (31 pages).
Office Action dated Jul. 14, 2021, issued in KR Application No. 10-2020-7019876, with English Translation. (counterpart to U.S. Appl. No. 16/498,708)(8 pages).
Office Action dated Aug. 31, 2021, issued in counterpart JP Application No. 2020-134437, with English Translation. (6 pages).
Office Action dated Oct. 28, 2021, issued in TW Application No. 110135963, with English Translation. (Counterpart to U.S. Appl. No. 16/498,708) (9 pages).
Office Action dated Dec. 2, 2021, issued in counterpart CN application No. 201880021943.9, with English translation. (18 pages).
Office Action dated Dec. 24, 2021, issued in JP Application 2019-228591, with English Translation. (counterpart to U.S. Appl. No. 16/498,708) (10 pages).

* cited by examiner

Viewing side

IN-CELL LIQUID CRYSTAL PANEL AND LIQUID CRYSTAL DISPLAY DEVICE

TECHNICAL FIELD

The present invention relates to an in-cell type liquid crystal cell in which a touch sensing function is incorporated, and an in-cell type liquid crystal panel comprising a pressure-sensitive adhesive layer attached polarizing film on the viewing side of the in-cell type liquid crystal cell. Further, the present invention relates to a liquid crystal display device using the liquid crystal panel. The liquid crystal display device with a touch sensing function using the in-cell type liquid crystal panel of the present invention can be used as various input display devices for mobile devices and the like.

BACKGROUND ART

Generally, in liquid crystal display devices, polarizing films are bonded to both sides of a liquid crystal cell with a pressure-sensitive adhesive layer interposed therebetween from the viewpoint of image forming system. In addition, ones that mount a touch panel on a display screen of a liquid crystal display device have been put to practical use. As the touch panel, there are various methods such as an electrostatic capacitance type, a resistive film type, an optical type, an ultrasonic type, an electromagnetic induction type and the like, but an electrostatic capacitance type has been increasingly adopted. In recent years, a liquid crystal display device provided with a touch sensing function that incorporates an electrostatic capacitance sensor as a touch sensor unit has been used.

On the one hand, at the time of manufacturing a liquid crystal display device, when laminating the pressure-sensitive adhesive layer attached polarizing film to a liquid crystal cell, a release film is peeled from the pressure-sensitive adhesive layer of the pressure-sensitive adhesive layer attached polarizing film, and static electricity is generated by such peeling. Static electricity is also generated when a surface protective film of the polarizing film stuck to the liquid crystal cell is peeled off or when a surface protective film of the cover window is peeled off. The static electricity generated in this way affects the alignment of the liquid crystal layer inside the liquid crystal display device and causes defects. Generation of static electricity can be suppressed, for example, by forming an antistatic layer on the outer surface of the polarizing film.

On the other hand, the electrostatic capacitance sensor in the liquid crystal display device provided with a touch sensing function detects a weak electrostatic capacitance formed by a transparent electrode pattern and the finger when the user's finger approaches the surface. In the case where a conductive layer such as an antistatic layer is provided between the transparent electrode pattern and the user's finger, the electric field between a driving electrode and a sensor electrode is disturbed, the sensor electrode capacitance becomes unstable and the touch panel sensitivity decreases, causing malfunction. In a liquid crystal display device provided with a touch sensing function, it is required to suppress the occurrence of static electricity and suppress the malfunction of the capacitance sensor. For example, in order to reduce the occurrence of display defects and malfunctions in a liquid crystal display device provided with a touch sensing function for the purpose of solving the above-mentioned problems, it has been proposed to dispose a polarizing film having an antistatic layer with a surface resistance value of from $1.0 \times 10^9$ to $1.0 \times 10^{11} \Omega/\square$ on the viewing side of a liquid crystal layer (Patent Document 1).

PRIOR ART DOCUMENT

Patent Document

Patent Document 1: JP-A-2013-105154

SUMMARY OF THE INVENTION

Problems to be Solved by the Invention

According to the polarizing film comprising an antistatic layer described in Patent Document 1, generation of static electricity can be suppressed to some extent. However, in Patent Document 1, the placement position of the antistatic layer is more distant than the fundamental position where static electricity is generated, so this case is not effective as compared with the case where the pressure-sensitive adhesive layer is provided with the antistatic function. In addition, in a liquid crystal display device provided with a touch sensing function, it was found that conduction from the side can be imparted by providing a conduction structure on the side surface of a polarizing film, but when an antistatic layer is thin, the contact area with the conduction structure on the side surface is small, so that sufficient conductivity cannot be obtained, resulting in the occurrence of conduction failure. On the other hand, it was found that the sensitivity of a touch sensor decreases as the thickness of the antistatic layer increases. Further, it was found that the antistatic layer provided on the outer surface of the polarizing film did not have sufficient conductivity, resulting in the occurrence of conduction failure, because of no need to adhere to the conduction structure provided on the side in a humidified or heated environment (after humidification or heating reliability test).

On the other hand, the pressure-sensitive adhesive layer to which an antistatic function is imparted is effective for suppressing generation of static electricity and preventing static electricity unevenness more than the antistatic layer provided on the polarizing film. However, it was found that when the conductive function of the pressure-sensitive adhesive layer is enhanced with importance placed on the antistatic function of the pressure-sensitive adhesive layer, the touch sensor sensitivity is lowered. In particular, it was found that the touch sensor sensitivity is lowered in the liquid crystal display device provided with a touch sensing function. Further, it was found that the antistatic agent blended in the pressure-sensitive adhesive layer for enhancing the conductive function segregates at the interface with the polarizing film in a humidified condition (after a humidification reliability test) or moves to the viewing side interface of the liquid crystal cell, resulting in causing insufficient durability.

It is an object of the present invention to provide an in-cell type liquid crystal panel comprising an in-cell type liquid crystal cell and a pressure-sensitive adhesive layer attached polarizing film applied to the viewing side thereof, which has a good antistatic function and can satisfy touch sensor sensitivity as well as conduction reliability and durability in humid environments.

Another object of the present invention is to provide a liquid crystal display device using the liquid crystal panel.

Means for Solving the Problems

As a result of extensive studies to solve the above problems, the present inventors have found that the problems can be solved by the following in-cell type liquid crystal panel and have completed the present invention.

That is, the present invention relates to an in-cell type liquid crystal panel comprising:

an in-cell type liquid crystal cell that is provided with a liquid crystal layer comprising liquid crystal molecules which are homogeneously oriented in the absence of an electric field, a first transparent substrate and a second transparent substrate sandwiching the liquid crystal layer on both sides, and a touch sensing electrode unit related to a touch sensor and a touch driving function between the first transparent substrate and the second transparent substrate; and a pressure-sensitive adhesive layer attached polarizing film that is disposed, via a first pressure-sensitive adhesive layer and without interposing a conductive layer, to the first transparent substrate side on the viewing side of the in-cell type liquid crystal cell, wherein:

the pressure-sensitive adhesive layer attached polarizing film comprises a surface treatment layer, a first polarizing film, and the first pressure-sensitive adhesive layer in this order, or comprises the surface treatment layer, the first polarizing film, an anchor layer, and the first pressure-sensitive adhesive layer in this order, and at least one layer selected from among the surface treatment layer, the anchor layer, and the first pressure sensitive adhesive layer includes an antistatic agent.

In the in-cell type liquid crystal panel, a conduction structure can be provided on the side surface of the layer including the antistatic agent among the surface treatment layer, the anchor layer, and the first pressure-sensitive adhesive layer of the pressure-sensitive adhesive layer attached polarizing film.

In the in-cell type liquid crystal panel, it is preferable that at least one layer selected from the surface treatment layer, the anchor layer and the first pressure-sensitive adhesive layer satisfies the following surface resistance value:

$1 \times 10^7$ to $1 \times 10^{11} \Omega/\square$ in case of the surface treatment layer, $1 \times 10^8$ to $1 \times 10^{11} \Omega/\square$ in case of the anchor layer, and $1 \times 10^8$ to $1 \times 10^{11} \Omega/\square$ in case of the first pressure-sensitive adhesive layer.

In the in-cell type liquid crystal panel, the first pressure-sensitive adhesive layer can include the antistatic agent. The antistatic agent is preferably an alkali metal salt and/or an organic cation-anion salt.

In the in-cell type liquid crystal panel, it is preferable that any two or more layers selected from the surface treatment layer, the anchor layer, and the first pressure-sensitive adhesive layer include the antistatic agent.

In the in-cell type liquid crystal panel, as the touch sensing electrode unit, one that is disposed between the liquid crystal layer and the first transparent substrate or the second transparent substrate can be used. As the touch sensing electrode unit, one disposed between the liquid crystal layer and the first transparent substrate, and one disposed between the liquid crystal layer and the second transparent substrate can be used.

In the in-cell type liquid crystal panel, the touch sensing electrode unit that can be used is formed from a touch sensor electrode and a touch driving electrode.

In the in-cell type liquid crystal panel, when the touch sensing electrode unit is disposed between the liquid crystal layer and the first transparent substrate or the second transparent substrate, the touch sensing electrode unit that can be used is an electrode integrally formed with a touch sensor electrode and a touch driving electrode.

In the in-cell type liquid crystal panel, a second polarizing film disposed on the second transparent substrate side of the in-cell type liquid crystal cell via a second pressure-sensitive adhesive layer can be provided.

The present invention also relates to a liquid crystal display device comprising the in-cell type liquid crystal panel.

Effect of the Invention

Since antistatic function is imparted to at least one layer selected from the surface treatment layer, the anchor layer, and the pressure-sensitive adhesive layer, the pressure-sensitive adhesive layer attached polarizing film on the viewing side of the in-cell type liquid crystal panel of the present invention can be in contact with a conduction structure on the side surface in the in-cell type liquid crystal panel and can secure a sufficient contact area. Therefore, conduction on the side surface of at least one layer in the pressure-sensitive adhesive layer attached polarizing film can be ensured, and the occurrence of electrostatic unevenness due to the conduction failure can be suppressed, so that conduction reliability in a humidified environment can also be satisfied. When antistatic function is imparted to at least two layers selected from the surface treatment layer, the anchor layer and the pressure-sensitive adhesive layer, the conduction is more effectively ensured to be able to suppress the generation of electrostatic unevenness due to conduction failure, and also to satisfy conduction reliability in a humidified environment.

In the pressure-sensitive adhesive layer attached polarizing film of the present invention, the surface resistance value of at least one layer selected from the surface treatment layer, the anchor layer, and the pressure-sensitive adhesive layer can be controlled within a predetermined range. As described above, the pressure-sensitive adhesive layer attached polarizing film of the present invention reduces the surface resistance value of at least one layer in the pressure-sensitive adhesive layer attached polarizing film while controlling so that the touch sensor sensitivity does not decrease or the durability under humidified environment does not deteriorate, thereby to be able to provide a predetermined antistatic function. Therefore, the pressure-sensitive adhesive layer attached polarizing film of the present invention can satisfy the touch sensor sensitivity and durability in a humidified environment while having a good antistatic function.

MODE FOR CARRYING OUT THE INVENTION

Figure 1:
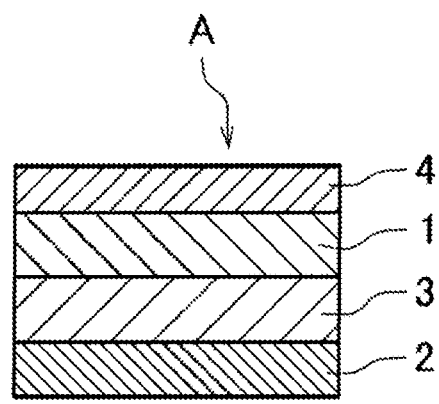
FIG. 1 is a cross-sectional view showing an example of a pressure-sensitive adhesive layer attached polarizing film used on the viewing side of the in-cell type liquid crystal panel of the present invention.

Hereinafter, the present invention will be described with reference to the drawings. A pressure-sensitive adhesive layer attached polarizing film A to be used for the viewing side of the in-cell type liquid crystal panel of the present invention comprises a surface treatment layer 4, a first polarizing film 1 and a first pressure-sensitive adhesive layer 2 in this order, or comprises the surface treatment layer 4, the first polarizing film 1, an anchor layer 3, and the first pressure-sensitive adhesive layer 2 in this order. FIG. 1 illustrates a case where the surface treatment layer 4, the first polarizing film 1, the anchor layer 3 and the first pressure-sensitive adhesive layer 2 are provided in this order. The pressure-sensitive adhesive layer attached polarizing film A of the present invention is disposed on the side of a transparent substrate 41 on the viewing side of an in-cell type liquid crystal cell B shown in, for example, FIGS. 2 to 6 by the pressure-sensitive adhesive layer 2. Although not shown in FIG. 1, a separator may be provided in the first pressure-sensitive adhesive layer 2 of the pressure-sensitive adhesive layer attached polarizing film A of the present invention, and a surface protective film may be provided on the surface treatment layer 4. In addition, the pressure-sensitive adhesive layer attached polarizing film for a liquid crystal cell with a built-in touch sensing function controls a surface resistance value to impart conductivity in at least one layer selected from the surface treatment layer, the anchor layer, and the first pressure-sensitive adhesive layer. The control of the surface resistance value may be performed in the at least one layer, but from the viewpoint of securing a contact area and adhesiveness with the conduction structure provided on the side surface in a humidified or heated environment, it is preferable that the surface resistance value is controlled in at least two layers, in particular, in the anchor layer 3 and the first pressure-sensitive adhesive layer 2.

The thickness of the anchor layer 3 is preferably from 0.01 to 0.5 μm, preferably from 0.01 to 0.2 μm, further preferably from 0.01 to 0.1 μm, from the viewpoints of stability of the surface resistance value and adhesiveness to the pressure-sensitive adhesive layer. In addition, the surface resistance value of the anchor layer 3 is preferably from $1\times10^8$ to $1\times10^{12}\Omega/\square$, preferably from $1\times10^8$ to $1\times10^{11}\Omega/\square$, further preferably from $1\times10^8$ to $1\times10^{10}\Omega/\square$, from the viewpoints of antistatic function and touch sensor sensitivity.

The thickness of the first pressure-sensitive adhesive layer 2 is preferably 5 to 100 μm, preferably 5 to 50 μm, and further preferably 10 to 35 μm from the viewpoint of securing durability and securing a contact area with the conduction structure on the side surface. When controlling the conductivity of the first pressure-sensitive adhesive layer 2, the surface resistance value of the first pressure-sensitive adhesive layer 2 is preferably from $1\times10^8$ to $1\times10^{12}\Omega/\square$, preferably from $1\times10^8$ to $1\times10^{11}\Omega/\square$, further preferably from $1\times10^8$ to $1\times10^{10}\Omega/\square$, in view of antistatic function and touch sensor sensitivity.

When controlling the conductivity of the surface treatment layer 4, the surface resistance value of the surface treatment layer 4 is preferably from $1\times10^7$ to $1\times10^{11}\Omega/\square$, preferably from $1\times10^7$ to $1\times10^{10}\Omega/\square$, further preferably from $1\times10^7$ to $1\times10^9\Omega/\square$, from the viewpoint of antistatic function and touch sensor sensitivity.

In addition, it is preferable that the surface resistance value on the pressure-sensitive adhesive layer 2 side in the pressure-sensitive adhesive layer attached polarizing film A satisfies the antistatic function and is controlled to $1\times10^8$ to $1\times10^{11}\Omega/\square$ so that the durability in a humidified environment is not reduced by a decreased touch sensor sensitivity. Such surface resistance value can be adjusted by controlling each surface resistance value of at least one layer of the surface treatment layer 4, the anchor layer 3 and the first pressure-sensitive adhesive layer 2. The surface resistance value is preferably from $1\times10^8$ to $6\times10^{10}\Omega/\square$, more preferably from $1\times10^8$ to $4\times10^{10}\Omega/\square$.

Hereinafter, the pressure-sensitive adhesive layer attached polarizing film A will be described. As described above, the pressure-sensitive adhesive layer attached polarizing film A of the present invention comprises the surface treatment layer 4, the first polarizing film 1, and the first pressure-sensitive adhesive layer 2 in this order, or comprises the surface treatment layer 4, the first polarizing film 1, the anchor layer 3, and the first pressure-sensitive adhesive layer 2 in this order.

<First Polarizing Film>

As the first polarizing film, one comprising a transparent protective film on one side or both sides of a polarizer is generally used. The polarizer is not particularly limited but various kinds of polarizers may be used. Examples of the polarizer include a film obtained by uniaxial stretching after a dichromatic substance, such as iodine and dichroic dye, is adsorbed to a hydrophilic high molecular weight polymer film, such as polyvinyl alcohol-based film, partially formalized polyvinyl alcohol-based film, and ethylene-vinyl acetate copolymer-based partially saponified film, a polyene-based alignment film, such as dehydrated polyvinyl alcohol and dehydrochlorinated polyvinyl chloride, and the like. Among them, a polarizer composed of a polyvinyl alcohol-based film and a dichroic substance such as iodine is suitable. Thickness of these polarizers is not particularly limited but is generally about 80 μm or less.

As a polarizer, a thin polarizer with a thickness of 10 μm or less can be used. From the viewpoint of thinning, the thickness is preferably from 1 to 7 μm. It is preferable that such a thin polarizer has less unevenness in thickness, excellent visibility, and less dimensional change, so it is excellent in durability, and furthermore, the thickness as a polarizing film can be reduced.

As a material constituting the transparent protective film, for example, a thermoplastic resin excellent in transparency, mechanical strength, thermal stability, moisture barrier property, isotropy, and the like is used.

Specific examples of such thermoplastic resin include cellulose resin such as triacetyl cellulose, polyester resin, polyether sulfone resin, polysulfone resin, polycarbonate resin, polyamide resin, polyimide resin, polyolefin resin, (meth)acrylic resin, cyclic polyolefin resin (norbornene-based resin), polyarylate resin, polystyrene resin, polyvinyl alcohol resin, and mixtures thereof. In addition, a transparent protective film is bonded together by an adhesive layer on one side of the polarizer, but a (meth)acrylic, urethane-based, acrylic urethane-based, epoxy-based, or silicone-based thermosetting resin or an ultraviolet curable resin can be used on the other side as the transparent protective film. The transparent protective film may contain one or more appropriate additives.

The adhesive used to bond the polarizer and the transparent protective film is not particularly limited as long as such adhesive is optically transparent, and various aqueous, solvent-based, hot melt-based, radical curable, or cationic curable types are used. However, aqueous adhesives or radical curable type adhesives are preferred.

<Antistatic Agent>

As described above, an antistatic agent is used in at least one selected from the surface treatment layer, the anchor layer, and the first pressure-sensitive adhesive layer so as to impart conductivity. Examples of the antistatic agent include materials that can impart antistatic property, such as an ionic surfactant, a conductive polymer, and conductive microparticles, and the like. As the antistatic agent, an ionic compound can be used.

Examples of the ionic surfactant include cationic surfactants (for example, quaternary ammonium salt type, phosphonium salt type, sulfonium salt type, etc.), anionic surfactants (carboxylic acid type, sulfonate type, sulfate type, phosphate type, phosphite type, etc.), amphoteric surfactants (sulfobetaine type, alkylbetain type, alkylimidazolium betaine type, etc.) or nonionic surfactants (polyhydric alcohol derivative, β-cyclodextrin inclusion compound, sorbitan fatty acid monoester/diester, polyalkylene oxide derivative, amine oxide, etc.).

Examples of the conductive polymer include polymers of polyaniline-based, polythiophene-based, polypyrrole-based, polyquinoxaline-based, and the like, among which polymers such as polyaniline and polythiophene which are likely to be water soluble conductive polymers or water dispersible conductive polymers are preferably used. Polythiophene is particularly preferable.

As the conductive microparticles, metal oxides such as tin oxide type, antimony oxide type, indium oxide type, zinc oxide type and the like can be mentioned. Of these, the tin oxide type is preferable. Examples of tin oxide type materials include antimony-doped tin oxide, indium-doped tin oxide, aluminum-doped tin oxide, tungsten-doped tin oxide, titanium oxide-cerium oxide-tin oxide complex, titanium oxide-tin oxide complex and the like, in addition to tin oxide. The average particle diameter of the microparticles is about from 1 to 100 nm, preferably from 2 to 50 nm.

Further, as other antistatic agents, there are exemplified polymers having an ion conductive group, such as a homopolymer of a monomer having an ion conductive group such as acetylene black, ketjen black, natural graphite, artificial graphite, titanium black, cation type (quaternary ammonium salt etc.), amphoteric type (betaine compound etc.), anion type (sulfonic acid salt etc.) or nonionic type (glycerin etc.), and a copolymer of the above monomer and another monomer; an ion conductive polymer having a site derived from an acrylate or a methacrylate having a quaternary ammonium base; and a permanent antistatic agent of a type in which a hydrophilic polymer such as a polyethylene methacrylate copolymer is alloyed to an acrylic resin or the like.

<<Ionic Compound>>

As the ionic compound, an alkali metal salt and/or an organic cation-anion salt can be preferably used. As the alkali metal salt, an organic salt and an inorganic salt of an alkali metal can be used. The "organic cation-anion salt" in the present invention means an organic salt, the cation moiety of which is composed of an organic substance and the anion moiety may be an organic substance or an inorganic substance. The "organic cation-anion salt" is also called an ionic liquid or an ionic solid.

<Alkali Metal Salt>

As an alkali metal ion that constitutes the cation moiety of an alkali metal salt, each ion of lithium, sodium, and potassium is mentioned. Among these alkali metal ions, lithium ion is preferable.

The anion moiety of the alkali metal salt may be composed of an organic substance or an inorganic substance. Examples of the anion moiety constituting the organic salt include $CH_3COO^-$, $CF_3COO^-$, $CH_3SO_3^-$, $CF_3SO_3^-$, $(CF_3SO_2)_3C^-$, $C_4F_9SO_3^-$, $C_3F_7COO^-$, $(CF_3SO_2)(CF_3CO)N^-$, $(FSO_2)_2N^-$, $^-O_3S(CF_2)_3SO_3^-$, $PF_6^-$, $CO_3^{2-}$, and the following general formulas (1) to (4):

$(C_nF_{2n+1}SO_2)_2N^-$ (wherein n is an integer of from 1 to 10),  (1):

$CF_2(C_mF_{2m}SO_2)_2N^-$ (wherein m is an integer of from 1 to 10),  (2):

$^-O_3S(CF_2)_lSO_3^-$ (wherein l is an integer of from 1 to 10),  (3):

$(C_pF_{2p+1}SO_2)N^-(C_qF_{2q+1}SO_2)$ (wherein p and q are each an integer of from 1 to 10), and the like.  (4):

In particular, an anion moiety containing a fluorine atom is preferably used since such a moiety is able to give an ionic compound having a good ion dissociation property. Examples of the anion moiety constituting the inorganic salt to be used include $Cl^-$, $Br^-$, $I^-$, $AlCl_4^-$, $Al_2Cl_7^-$, $BF_4^-$, $PF_6^-$, $ClO_4^-$, $NO_3^-$, $AsF_6^-$, $SbF_6^-$, $NbF_6^-$, $TaF_6^-$, $(CN)_2N^-$, and the like are used. As the anion moiety, (perfluoroalkylsulfonyl) imide represented by the general formula (1), such as $(CF_3SO_2)_2N^-$ and $(C_2F_5SO_2)_2N^-$, are preferable, and (trifluoromethanesulfonyl) imide represented by $(CF_3SO_2)_2N^-$ is particularly preferable.

Specific examples of the alkali metal organic salt include preferably sodium acetate, sodium alginate, sodium lignin sulfonate, sodium toluene sulfonate, $LiCF_3SO_3$, $Li(CF_3SO_2)_2N$, $Li(CF_3SO_2)_2N$, $Li(C_2F_5SO_2)_2N$, $Li(C_4F_9SO_2)_2N$, $Li(CF_3SO_2)_3C$, $KO_3S(CF_2)_3SO_3K$, and $LiO_3S(CF_2)_3SO_3K$. Of these, $LiCF_3SO_3$, $Li(CF_3SO_2)_2N$, $Li(C_2F_5SO_2)_2N$, $Li(C_4F_9SO_2)_2N$, $Li(CF_3SO_2)_3C$, and the like are preferable, and fluorine-containing lithium imide salts such as $Li(CF_3SO_2)_2N$, $Li(C_2F_6SO_2)_2N$, and $Li(C_4F_9SO_2)_2N$ are more preferable, and (perfluoroalkylsulfonyl)imide lithium salt is particularly preferable.

Moreover, as an inorganic salt of an alkali metal, there are mentioned lithium perchlorate and lithium iodide.

<Organic Cation-Anion Salt>

The organic cation-anion salt used in the present invention is composed of a cation component and an anion component, and the cation component is composed of an organic substance. Specific examples of the cation component include a pyridinium cation, a piperidinium cation, a pyrrolidinium cation, a cation having a pyrroline skeleton, a cation having a pyrrole skeleton, an imidazolium cation, a tetrahydropyrimidinium cation, a dihydropyrimidinium cation, a pyrazolium cation, a pyrazolinium cation, a tetraalkylammonium cation, a trialkylsulfonium cation, a tetraalkylphosphonium cation, and the like.

Examples of the anion component to be used include $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2C^-$, $AsF_6^-$, $SbF_6^-$, $NbF_6^-$, $TaF_6^-$, $(CN)_2N^-$, $C_4F_9SO_3^-$, $C_3F_7COO^-$, $(CF_3SO_2)(CF_3CO)N^-$, $(FSO_2)_2N^-$, $O_3S(CF_2)_3SO_3^-$, and the following general formulas (1) to (4):

$(C_nF_{2n+1}SO_2)_2N^-$ (wherein n is an integer of from 1 to 10),  (1):

$CF_2(C_mF_{2m}SO_2)_2N^-$ (wherein m is an integer of from 1 to 10),  (2):

$^-O_3S(CF_2)_lSO_3^-$ (wherein l is an integer of from 1 to 10),  (3):

$(C_pF_{2p+1}SO_2)N^-(C_qF_{2q+1}SO_2)$ (wherein p and q are each an integer of from 1 to 10), and the like. Among them, an anion component containing a fluorine atom is particularly preferably used because an ionic compound having a good ion dissociation property can be obtained.  (4):

In addition to the alkali metal salts and organic cation-anion salts, examples of the ionic compound include inorganic salts such as ammonium chloride, aluminum chloride, copper chloride, ferrous chloride, ferric chloride, ammonium sulfate, and the like. These ionic compounds can be used singly or in combination of two or more thereof.

<Anchor Layer>

In the case of imparting conductivity to the anchor layer, it is preferable that such an anchor layer has a thickness of from 0.01 to 0.5 μm and a surface resistance value of from $1\times10^8$ to $1\times10^{12}\Omega/\square$ as described above. The conductive anchor layer can be famed from various antistatic agent compositions. Among the above-mentioned examples, an ionic surfactant type, a conductive polymer type, conductive microparticles, and the like are preferable as the antistatic agent for forming the anchor layer.

Among these antistatic agents, conductive polymers are preferably used from the viewpoints of optical properties, appearance, antistatic effect, and stability of antistatic effects during heating or humidification. In particular, conductive polymers such as polyaniline and polythiophene are preferably used. Those which are soluble in an organic solvent or water or are dispersible in water can be appropriately used as a conductive polymer, but a water-soluble conductive polymer or a water-dispersible conductive polymer is preferably used. This is because the water-soluble conductive polymer and the water-dispersible conductive polymer can be prepared as an aqueous solution or an aqueous dispersion of a coating liquid for forming the antistatic layer without requiring a nonaqueous organic solvent, so that deterioration of the optical film substrate due to the organic solvent can be suppressed. The aqueous solution or aqueous dispersion may contain an aqueous solvent in addition to water. For example, it is possible to use alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol.

In addition, it is preferable that the water-soluble conductive polymer or the water-dispersible conductive polymer such as polyaniline and polythiophene has a hydrophilic functional group in the molecule. Examples of the hydrophilic functional group include a sulfone group, an amino group, an amide group, an imino group, a quaternary ammonium salt group, a hydroxyl group, a mercapto group, a hydrazino group, a carboxyl group, a sulfate group, a phosphate group, or salts thereof. By having a hydrophilic functional group in the molecule, the conductive polymer is easily dissolved in water or easily dispersed to microparticles in water, thereby to be able to easily prepare the water-soluble conductive polymer or water-dispersible conductive polymer.

Examples of commercially available water-soluble conductive polymers include polyaniline sulfonic acid (weight average molecular weight in terms of polystyrene: 150,000, manufactured by Mitsubishi Rayon Co., Ltd.) and the like. Examples of commercially available water-dispersible conductive polymers include polythiophene-based conductive polymers (trade name: DENATRON series, manufactured by Nagase ChemteX Corporation) and the like.

As a material for forming the anchor layer, a binder component may be added together with the antistatic agent for the purpose of improving film forming property of the antistatic agent, adhesiveness to an optical film, and the like. In the case where the antistatic agent is an aqueous material such as a water-soluble conductive polymer or a water-dispersible conductive polymer, a water-soluble or water-dispersible binder component is used. Examples of the binder include oxazoline group-containing polymers, polyurethane-based resins, polyester-based resins, acrylic resins, polyether-based resins, cellulose-based resins, polyvinyl alcohol-based resins, epoxy resins, polyvinyl pyrrolidone, polystyrene-based resins, polyethylene glycol, pentaerythritol, and the like. In particular, polyurethane-based resins, polyester-based resins, and acrylic resins are preferred. One or two or more kinds of these binders can be appropriately used according to the intended application.

The amount of each of the antistatic agent and the binder to be used is preferably controlled so that the surface resistance value of the resulting anchor layer is within a range of from $1.0\times10^2$ to $1.0\times10^{12}\Omega/\square$ depending on the kind of the antistatic agent and the binder.

<First Pressure-Sensitive Adhesive Layer>

In the case of imparting conductivity to the first pressure-sensitive adhesive layer, it is preferable that the first pressure-sensitive adhesive layer is famed in such a manner to have a thickness of from 5 to 100 μm and a surface resistance value of from $1\times10^8$ to $1\times10^{12}\Omega/\square$ as described above. The conductive first pressure-sensitive adhesive layer can be famed from a composition in which an antistatic agent is mixed with various pressure-sensitive adhesives.

As a pressure-sensitive adhesive for forming the first pressure-sensitive adhesive layer, various pressure-sensitive adhesives can be used. Examples of the pressure-sensitive adhesives include rubber-based pressure-sensitive adhesives, acrylic pressure-sensitive adhesives, silicone-based pressure-sensitive adhesives, urethane-based pressure-sensitive adhesives, vinyl alkyl ether-based pressure-sensitive adhesives, polyvinylpyrrolidone-based pressure-sensitive adhesives, polyacrylamide-based pressure-sensitive adhesives, cellulose-based pressure-sensitive adhesives, and the like. A pressure-sensitive adhesive base polymer is selected depending on the kind of the pressure-sensitive adhesives. Among the above-mentioned pressure-sensitive adhesives, an acrylic pressure-sensitive adhesive is preferably used from the viewpoints of excellent optical transparency, suitable adhesive properties such as wettability, cohesiveness and adhesion property, as well as excellent weather resistance, heat resistance and the like.

The acrylic pressure-sensitive adhesive contains a (meth) acrylic polymer as a base polymer. The (meth)acrylic polymer usually contains, as a monomer unit, an alkyl (meth) acrylate as a main component. Incidentally, (meth)acrylate refers to acrylate and/or methacrylate and the "(meth)" in the present invention is used in the same meaning.

As the alkyl (meth)acrylate constituting the main skeleton of the (meth)acrylic polymer, linear or branched alkyl groups each having 1 to 18 carbon atoms can be exemplified. These can be used alone or in combination. The average number of carbon atoms of these alkyl groups is preferably from 3 to 9.

From the viewpoints of adhesive properties, durability, adjustment of retardation, adjustment of refractive index, and the like, an alkyl (meth)acrylate containing an aromatic ring, such as phenoxyethyl (meth)acrylate and benzyl (meth) acrylate, can be used.

One or more kinds of copolymerizable monomers having a polymerizable functional group with an unsaturated double bond such as (meth)acryloyl group or vinyl group can be introduced into the (meth)acrylic polymer by copolymerization for the purpose of improving adhesiveness and heat resistance. Specific examples of such copolymerizable monomer include hydroxyl group-containing monomers, such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; carboxyl group-containing monomers, such as (meth)acrylic acid, carboxyethyl (meth)acrylate, carboxypentyl (meth)acrylate, itaconic acid, maleic acid, fumaric acid, and crotonic acid; acid anhydride group-containing monomers, such as maleic acid anhydride and itaconic acid anhydride; caprolactone adduct of acrylic acid; sulfonic acid group-containing monomers, such as styrene sulfonic acid, allylsulfonic acid, 2-(meth)acrylamide-2-methylpropane sulfonic acid, (meth)acrylamidopropane sulfonic acid, sulfopropyl (meth)acrylate, and (meth)acryloyloxy-naphthalene sulfonic acid; phosphoric acid group-containing monomers such as 2-hydroxyethyl acryloyl phosphate; and the like.

In addition, examples of a monomer usable for the purpose of property modification include: (N-substituted) amide-based monomers, such as (meth)acrylamide, N,N-dimethyl (meth)acrylamide, N-butyl (meth)acrylamide, N-methylol (meth)acrylamide, and N-methylolpropane (meth)acrylamide; alkylaminoalkyl-based (meth)acrylate monomers, such as aminoethyl (meth)acrylate, N,N-dimethylaminoethyl (meth)acrylate, and t-butylaminoethyl (meth)acrylate; alkoxyalkyl-based (meth)acrylate monomers, such as methoxyethyl (meth)acrylate and ethoxyethyl (meth)acrylate; succinimide-based monomers, such as N-(meth)acryloyloxymethylene succinimide, N-(meth)acryloyl-6-oxyhexamethylene succinimide, N-(meth)acryloyl-8-oxyoctamethylene succinimide, and N-acryloylmorpholine; maleimide-based monomers, such as N-cyclohexyl maleimide, N-isopropyl maleimide, N-lauryl maleimide, and N-phenyl maleimide; itaconimide-based monomers, such as N-methyl itaconimide, N-ethyl itaconimide, N-butyl itaconimide, N-octyl itaconimide, N-2-ethylhexyl itaconimide, N-cyclohexyl itaconimide, and N-lauryl itaconimide; and the like.

As the modifying monomer, it is also possible to use: a vinyl-based monomer, such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinyl-carboxylic acid amides, styrene, α-methylstyrene, and N-vinylcaprolactam; a cyanoacrylic monomer, such as acrylonitrile and methacrylonitrile; an epoxy group-containing acrylic monomer, such as glycidyl (meth)acrylate; a glycol-based acrylic ester monomer, such as polyethylene glycol (meth)acrylate, polypropylene glycol (meth)acrylate, methoxyethylene glycol (meth)acrylate, and methoxypolypropylene glycol (meth)acrylate; an acrylic acid ester-based monomer, such as tetrahydrofurfuryl (meth)acrylate, fluoro(meth)acrylate, silicone (meth)acrylate, and 2-methoxyethyl acrylate; and the like. Further, isoprene, butadiene, isobutylene, vinyl ether, and the like can be mentioned as the modifying monomer.

Other examples of the copolymerizable monomer include a silane-based monomer containing a silicon atom. Examples of the silane-based monomer include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, 10-acryloyloxydecyltriethoxysilane, and the like.

As the copolymerizable monomer, it is also possible to use a polyfunctional monomer having two or more unsaturated double bonds of a (meth)acryloyl group, a vinyl group or the like, such as an esterified substance of (meth)acrylic acid and polyalcohol, wherein the esterified substance includes: tripropylene glycol di(meth)acrylate, tetraethylene glycol di(meth)acrylate, 1,6-hexanediol di(meth)acrylate, bisphenol A diglycidyl ether di(meth)acrylate, neopentyl glycol di(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, and caprolactone-modified dipentaerythritol hexa(meth)acrylate; and polyester(meth)acrylate, epoxy (meth)acrylate and urethane (meth)acrylate obtained by adding, as the same functional group as that in the monomer component, two or more unsaturated double bonds of a (meth)acryloyl group, a vinyl group or the like, respectively, to polyester, epoxy and urethane as a backbone.

The (meth)acrylic polymer consists primarily of an alkyl (meth)acrylate in terms of a weight % with respect to all the monomers thereof, and a ratio of the copolymerizable monomer in the (meth)acrylic polymer is not particularly limited but is about from 0 to 20%, preferably about from 0.1 to 15%, more preferably about from 0.1 to 10%.

Among these copolymerizable monomers, the hydroxyl group-containing monomer and the carboxyl group-containing monomer are preferably used from the viewpoints of adhesion property and durability. Further, the hydroxyl group-containing monomer and the carboxyl group-containing monomer can be used in combination. In the case where the pressure-sensitive adhesive composition contains a crosslinking agent, these copolymerizable monomers serve as a reactive site with the crosslinking agent. The hydroxyl group-containing monomer and the carboxyl group-containing monomer are sufficiently reactive with an intermolecular crosslinking agent, so that such a monomer is preferably used to enhance cohesion property and heat resistance of a resulting pressure-sensitive adhesive layer. The hydroxyl group-containing monomer is preferable from the viewpoint of reworkability, and the carboxyl group-containing monomer is preferable from the viewpoint of achieving both durability and reworkability. When an antistatic agent is added, an amide group-containing monomer is preferably used from the viewpoint of easily lowering the resistance value and being stable even in a humidified environment and is used in combination with the hydroxyl group-containing monomer and the carboxyl group-containing monomer.

In the case of containing the hydroxyl group-containing monomer as the copolymerizable monomer, the content of the hydroxyl group-containing monomer is preferably from 0.01 to 15% by weight, more preferably from 0.03 to 10% by weight, still more preferably from 0.05 to 7% by weight. Further, in the case of containing the carboxyl group-containing monomer as the copolymerizable monomer, the content of the carboxyl group-containing monomer is preferably from 0.05 to 10% by weight, more preferably from 0.1 to 8% by weight, still more preferably from 0.2 to 6% by weight. In the case of containing the amide group-containing monomer, the proportion is preferably 0.1% by weight or more.

The (meth)acrylic polymer used in the present invention usually has a weight average molecular weight in the range of 500,000 to 3,000,000. Considering durability, particularly, heat resistance, the weight average molecular weight is preferably from 700,000 to 2,700,000, more preferably from 800,000 to 2,500,000. When the weight average molecular weight is smaller than 500,000, this molecular weight is not preferable from the viewpoint of heat resistance. In addition, when the weight average molecular weight is larger than 3,000,000, a large amount of diluting solvent is necessary for adjusting the viscosity for coating, and such a weight average molecular weight is not preferable, leading to an increase of cost. The weight average molecular weight is a value obtained by subjecting a measurement value from GPC (gel permeation chromatography) to a polystyrene conversion.

As regards production of the (meth)acrylic polymer, it is possible to appropriately select one of conventional production methods such as solution polymerization, bulk polymerization, emulsion polymerization and various radical polymerizations. The resulting (meth)acrylic polymer may be any type of copolymers such as a random copolymer, a block copolymer, and a graft copolymer.

As the antistatic agent used for forming the first pressure-sensitive adhesive layer, an ionic compound is preferable in terms of compatibility with the base polymer and transparency of the pressure-sensitive adhesive layer among the above examples. In particular, when an acrylic pressure-sensitive adhesive containing a (meth)acrylic polymer as a base polymer is used, it is preferable to use an ionic compound. As the ionic compound, an ionic liquid is preferable from the viewpoints of easily lowering the resistance value by the addition of a relatively small amount and being easy to be stabilized in a humidified environment.

The amounts of the pressure-sensitive adhesive and the antistatic agent to be used are controlled so that the surface resistance value of the obtained first pressure sensitive adhesive layer is from $1\times10^8$ to $1\times10^{12} \Omega/\square$, depending on the kind thereof. For example, the antistatic agent (for example, in the case of an ionic compound) is preferably used in a range of 0.05 to 20 parts by weight per 100 parts by weight of a base polymer of a pressure-sensitive adhesive (for example, a (meth)acrylic polymer). Use of the antistatic agent in an amount of 0.05 parts by weight or more is preferable for improving the antistatic performance. Furthermore, the antistatic agent (B) is used in an amount of preferably 0.1 parts by weight or more, more preferably 0.5 parts by weight or more. In order to satisfy the durability, the amount of the antistatic agent used is preferably 20 parts by weight or less, more preferably 10 parts by weight or less.

The pressure-sensitive adhesive composition for forming the first pressure-sensitive adhesive layer can contain a crosslinking agent corresponding to the base polymer. For example, when a (meth)acrylic polymer is used as the base polymer, an organic crosslinking agent or a polyfunctional metal chelate can be used as the crosslinking agent. Examples of the organic crosslinking agent include isocyanate type crosslinking agents, peroxide type crosslinking agents, epoxy type crosslinking agents, imine type crosslinking agents and the like. The polyfunctional metal chelate is one in which a polyvalent metal is covalently or coordinately bonded to an organic compound. As the polyvalent metal atom, there can be mentioned, for example, Al, Cr, Zr, Co, Cu, Fe, Ni, V, Zn, In, Ca, Mg, Mn, Y, Ce, Sr, Ba, Mo, La, Sn, Ti. The covalently or coordinately bonded atom in the organic compound may be an oxygen atom. Examples of the organic compound include alkyl esters, alcohol compounds, carboxylic acid compounds, ether compounds, ketone compounds, and the like.

The amount of the crosslinking agent to be used is preferably 3 parts by weight or less, more preferably from 0.01 to 3 parts by weight, still more preferably from 0.02 to 2 parts by weight, even still more preferably from 0.03 to 1 part by weight, per 100 parts by weight of the (meth)acrylic polymer.

The pressure-sensitive adhesive composition for forming a first pressure-sensitive adhesive layer may contain a silane coupling agent and other additives. For example, polyether compounds of polyalkylene glycol such as polypropylene glycol, powders such as colorants and pigments, dyes, surfactants, plasticizers, tackifiers, surface lubricants, leveling agents, softeners, antioxidants, anti-aging agents, light stabilizers, ultraviolet absorbers, polymerization inhibitors, inorganic or organic fillers, metal powder, particulates, foil-like materials, and the like. In addition, a redox system in which a reducing agent is added may be adopted within a controllable range. These additives are preferably used in an amount of 5 parts by weight or less, more preferably 3 parts by weight or less, still more preferably 1 part by weight or less, with respect to 100 parts by weight of the (meth)acrylic polymer.

<Surface Treatment Layer>

In the case of imparting conductivity to a surface treatment layer, as described above, the surface treatment layer is preferably formed to have a surface resistance value of from $1\times10^7$ to $1\times10^{11} \Omega/\square$. The surface treatment layer can be provided with conductivity by containing an antistatic agent. The surface treatment layer can be provided on a transparent protective film used for the first polarizing film or can be separately provided from the transparent protective film. As the surface treatment layer, a hard coat layer, an antiglare layer, an antireflective layer, an anti-sticking layer, and the like can be provided. As the antistatic agent used to impart conductivity to the surface treatment layer, those exemplified above can be used, but contain preferably at least one kind selected from ionic surfactants, conductive microparticles, and conductive polymers. The antistatic agent used in the surface treatment layer is preferably conductive microparticles from the viewpoints of optical properties, appearance, antistatic effect, and stability of antistatic effect at the time of heat and humidification.

The surface treatment layer is preferably a hard coat layer. As a material for forming the hard coat layer, for example, a thermoplastic resin or a material which is cured by heat or radiation can be used. Examples of such materials include thermosetting resins and radiation-curable resins such as ultraviolet curable resins and electron beam curable resins. Among them, ultraviolet curable resins are preferred, which can efficiently form a cured resin layer by a simple processing operation at the time of curing by ultraviolet radiation. Examples of such curable resins include a variety of resins such as polyester-based resins, acrylic resins, urethane-based resins, amide-based resins, silicone-based resins, epoxy-based resins, and melamine-based resins, including monomers, oligomers, and polymers thereof. In particular, radiation curable resins, specifically ultraviolet curable resins are preferred, because of high processing speed and less thermal damage to the base material. The ultraviolet curable resin to be preferably used is, for example, one having an ultraviolet-polymerizable functional group, particularly one containing an acrylic monomer or oligomer component having 2 or more, particularly 3 to 6 of such functional groups. In addition, a photopolymerization initiator is blended in the ultraviolet curable resin.

Further, as the surface treatment layer, an antiglare treatment layer or an antireflection layer can be provided for the purpose of improving visibility. An antiglare layer and an antireflection layer may be provided on the hard coat layer. The constituent material of the antiglare treatment layer is not particularly limited, and for example, a radiation curable resin, a thermosetting resin, a thermoplastic resin, or the like can be used. As the antireflection layer, titanium oxide, zirconium oxide, silicon oxide, magnesium fluoride or the like is used. Multiple layers can be provided for the antireflection layer. Other examples of the surface treatment layer include an anti-sticking layer and the like.

The thickness of the surface treatment layer can be appropriately set depending on the type of the surface treatment layer, but in general, such thickness is preferably from 0.1 to 100 µm. For example, the thickness of the hard coat layer is preferably from 0.5 to 20 µm. The thickness of the hard coat layer is not particularly limited, but if the thickness is too thin, sufficient hardness as the hard coat layer cannot be obtained, while if the thickness is too thick, cracking and peeling easily occur. The thickness of the hard coat layer is more preferably from 1 to 10 µm.

The amount of an antistatic agent and a binder (a resin material etc.) used in the surface treatment layer depends on the type thereof, but the surface resistance value of the surface treatment layer obtained is preferably controlled to be within the range of from $1 \times 10^7$ to $1 \times 10^{11} \Omega/\square$. Usually, the binder is used in an amount of preferably 1000 parts by weight or less, more preferably from 10 to 200 parts by weight, with respect to 100 parts by weight of the antistatic agent.

<Surface Protective Film>

As the surface protective film that can be provided on the surface treatment layer, one having a pressure-sensitive adhesive layer on at least one side of a support film can be used. The pressure-sensitive adhesive layer of the surface protective film may contain a light peeling agent, an antistatic agent, and the like. When the pressure-sensitive adhesive layer of the surface protective film contains an antistatic agent, the surface protective film is bonded to the surface treatment layer, followed by being peeled off, so that a conductive function can be provided also to the surface treatment layer surface which does not contain the antistatic agent. Thus, an antistatic agent can be contained in the surface treatment layer. As the antistatic agent, the same one as described above can be used. In order to impart a conductive function to the surface treatment layer surface by peeling the surface protective film, it is preferable to use a light peeling agent together with an antistatic agent in the pressure-sensitive adhesive layer of the surface protective film. As a light peeling agent, polyorganosiloxane, etc. can be illustrated, for example. The extent to which the conductive function is to be imparted to the surface of the surface treatment layer is determined by appropriately adjusting the amounts of a charged conductive agent and a light peeling agent. In addition, a surface protective film can also be provided on the surface of a second polarizing film described later.

<Other Layers>

In the pressure-sensitive adhesive layer attached polarizing film of the present invention, in addition to each layer described above, an easy adhesion layer is provided on the surface of the side where the first polarizing film or the anchor layer is provided, or various kinds of easy adhesion treatments such as corona treatment and plasma treatment can be applied.

Hereinafter, an in-cell type liquid crystal cell B and an in-cell type liquid crystal panel C will be described.

(In-Cell Type Liquid Crystal Cell B)

As shown in FIGS. 2 to 6, an in-cell type liquid crystal cell B includes a liquid crystal layer 20 containing liquid crystal molecules homogeneously aligned in the absence of an electric field, a first transparent substrate 41 and a second transparent substrate 42 sandwiching the liquid crystal layer 20 on both sides. In addition, a touch sensing electrode unit related to a touch sensor and a touch driving function is provided between the first transparent substrate 41 and the second transparent substrate 42.

Figure 2:
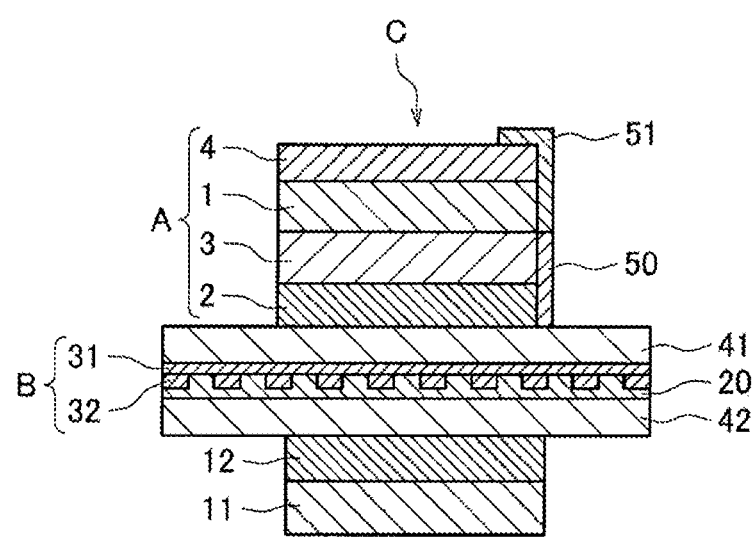
FIG. 2 is a cross-sectional view showing an example of the in-cell type liquid crystal panel of the present invention.
Figure 3:
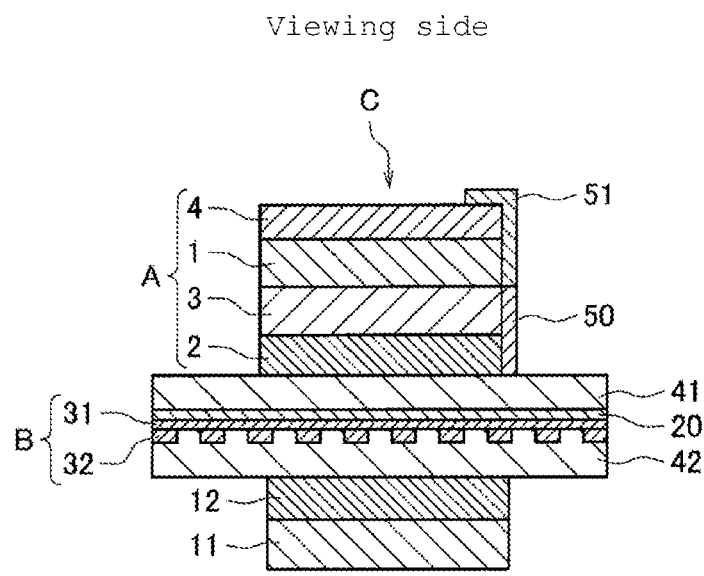
FIG. 3 is a cross-sectional view showing an example of the in-cell type liquid crystal panel of the present invention.
Figure 6:
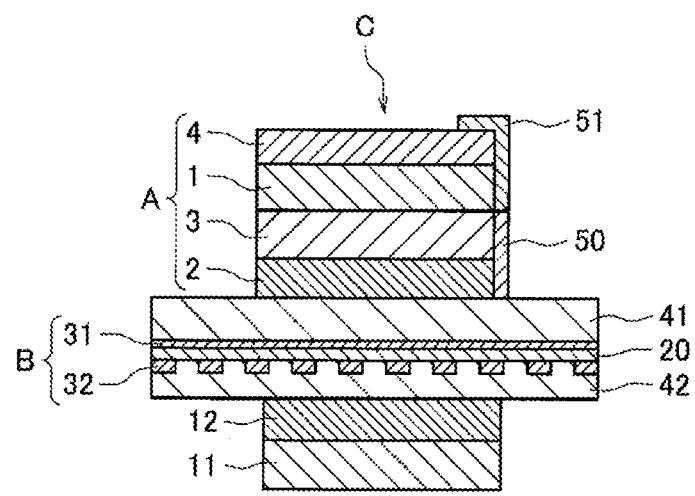
FIG. 6 is a cross-sectional view showing an example of the in-cell type liquid crystal panel of the present invention.

As shown in FIGS. 2, 3, and 6, the touch sensing electrode unit can be formed by a touch sensor electrode 31 and a touch driving electrode 32. The touch sensor electrode referred to herein means a touch detection (reception) electrode. The touch sensor electrode 31 and the touch driving electrode 32 can be independently formed in various patterns. For example, when the in-cell type liquid crystal cell B is a flat surface, it can be disposed in a pattern intersecting at right angles in a form independently provided in the X axis direction and the Y axis direction, respectively. In FIGS. 2, 3, and 6, the touch sensor electrode 31 is disposed on the side (viewing side) of the first transparent substrate 41 with respect to the touch driving electrode 32, but contrary to the above, the touch driving electrode 32 can be disposed on the side of the first transparent substrate 41 (viewing side) with respect to the touch sensor electrode 31.

Figure 4:
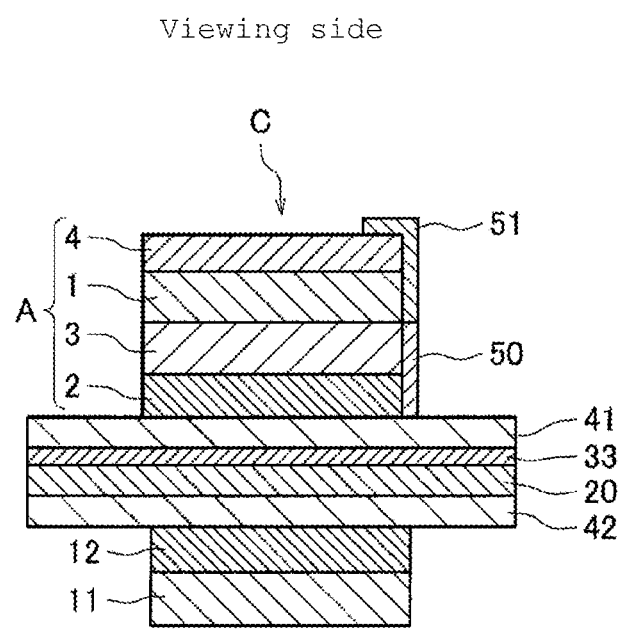
FIG. 4 is a cross-sectional view showing an example of the in-cell type liquid crystal panel of the present invention.
Figure 5:
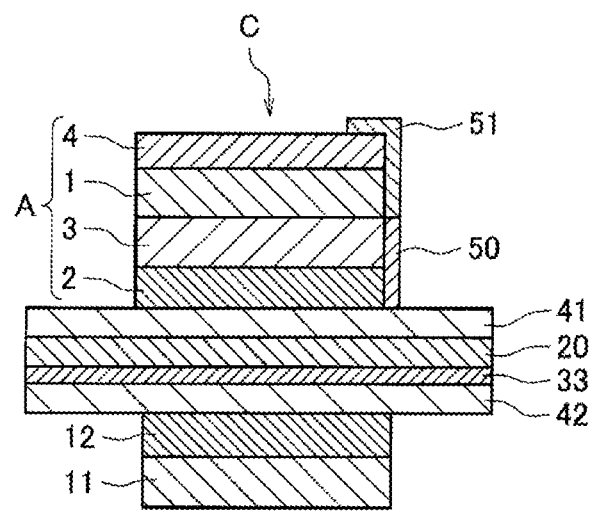
FIG. 5 is a cross-sectional view showing an example of the in-cell type liquid crystal panel of the present invention.

On the other hand, as shown in FIGS. 4 and 5, an electrode 33 in which a touch sensor electrode and a touch driving electrode are integrally formed can be used in the touch sensing electrode unit.

The touch sensing electrode unit may be disposed between the liquid crystal layer 20 and the first transparent substrate 41 or the second transparent substrate 42. Each of FIGS. 2 and 4 shows a case where the touch sensing electrode unit is disposed between the liquid crystal layer 20 and the first transparent substrate 41 (on the viewing side of the liquid crystal layer 20). FIGS. 3 and 5 show a case where the touch sensing electrode unit is disposed between the liquid crystal layer 20 and the second transparent substrate 42 (on the backlight side of the liquid crystal layer 20).

As shown in FIG. 6, the touch sensing electrode unit is able to have the touch sensor electrode 31 between the liquid crystal layer 20 and the first transparent substrate 41, and have the touch driving electrode 32 between the liquid crystal layer 20 and the second transparent substrate 42.

Note that a driving electrode in the touch sensing electrode unit (the touch driving electrode 32, the electrode 33 integrally formed with the touch sensor electrode and the touch driving electrode) can also serve as a common electrode for controlling the liquid crystal layer 20.

As the liquid crystal layer 20 used for the in-cell type liquid crystal cell B, a liquid crystal layer containing liquid crystal molecules homogeneously aligned in the absence of an electric field is used. As the liquid crystal layer 20, for example, an IPS type liquid crystal layer is suitably used. Besides, for the liquid crystal layer 20, for example, any type of liquid crystal layer, such as TN type, STN type, π type, VA type or the like, can be used. The thickness of the liquid crystal layer 20 is, for example, about from 1.5 µm to 4 µm.

As described above, the in-cell type liquid crystal cell B has the touch sensing electrode unit related to the touch sensor and the touch driving function in the liquid crystal cell and does not have the touch sensor electrode outside the liquid crystal cell. That is, a conductive layer (the surface resistance value is $1 \times 10^{13} \Omega/\square$ or less) is not provided on the viewing side (the liquid crystal cell side of the first pressure sensitive adhesive layer 2 of the in-cell type liquid crystal panel C) from the first transparent substrate 41 of the in-cell type liquid crystal cell B. Incidentally, in the in-cell type liquid crystal panel C shown in FIGS. 2 to 6, the order of each configuration is shown, but the in-cell type liquid crystal panel C can have other configurations as appropriate. A color filter substrate can be provided on the liquid crystal cell (the first transparent substrate 41).

Examples of the material for forming the transparent substrate include glass or polymer film. Examples of the polymer film include polyethylene terephthalate, polycycloolefin, polycarbonate, and the like. When the transparent substrate is formed of glass, its thickness is, for example, about from 0.1 mm to 1 mm. When the transparent substrate is formed of a polymer film, its thickness is, for example, about from 10 μm to 200 μm. The transparent substrate may have an easy adhesion layer or a hard coat layer on its surface.

The touch sensing electrode unit is formed as a transparent conductive layer from the touch sensor electrode 31 (electrostatic capacitance sensor) and the touch driving electrode 32, or from the electrode 33 integrally famed with the touch sensor electrode and the touch driving electrode. The constituent material of the transparent conductive layer is not particularly limited, and examples thereof include metals such as gold, silver, copper, platinum, palladium, aluminum, nickel, chromium, titanium, iron, cobalt, tin, magnesium, and tungsten, and alloys thereof. Examples of the constituent material of the transparent conductive layer include metal oxides such as oxides of metals (e.g. indium, tin, zinc, gallium, antimony, zirconium, and cadmium), specifically including indium oxide, tin oxide, titanium oxide, cadmium oxide, and a mixture of these metal oxides. Other metal compounds such as copper iodide and the like are used. The metal oxide may further contain an oxide of the metal atom shown in the above group, if necessary. For example, indium oxide (ITO) containing tin oxide, tin oxide containing antimony, etc. are preferably used, and ITO is particularly preferably used. The ITO preferably contains from 80 to 99% by weight of indium oxide and from 1 to 20% by weight of tin oxide.

The electrode (the touch sensor electrode 31, the touch driving electrode 32, and the electrode 33 famed integrally with the touch sensor electrode and the touch driving electrode) relating to the touch sensing electrode unit can be famed as a transparent electrode pattern usually on the inside of the first transparent substrate 41 and/or the second transparent substrate 42 (on the side of the liquid crystal layer 20 in the in-cell type liquid crystal cell B) by a conventional method. The transparent electrode pattern is usually electrically connected to a lead wiring (not shown) formed at an end portion of the transparent substrate, and the lead wiring is connected to a controller IC (not shown). The shape of the transparent electrode pattern may be any shape such as a stripe shape or a rhombic shape, in addition to a comb shape, depending on the application. The height of the transparent electrode pattern is, for example, from 10 nm to 100 nm and the width is from 0.1 mm to 5 mm.

(In-Cell Type Liquid Crystal Panel C)

As shown in FIGS. 2 to 6, the in-cell type liquid crystal panel C of the present invention is able to have a pressure-sensitive adhesive layer attached polarizing film A on the viewing side of the in-cell type liquid crystal cell B, and a second polarizing film 11 on the opposite side thereof. The pressure-sensitive adhesive layer attached polarizing film A is disposed on the side of the first transparent substrate 41 of the in-cell type liquid crystal cell B with the first pressure-sensitive adhesive layer 2 interposed therebetween without a conductive layer interposed therebetween. On the other hand, on the side of the second transparent substrate 42 of the in-cell type liquid crystal cell B, the second polarizing film 11 is disposed with the second pressure-sensitive adhesive layer 12 interposed therebetween. The first polarizing film 1 and the second polarizing film 11 in the pressure-sensitive adhesive layer attached polarizing film A are disposed so that the transmission axes (or absorption axes) of the respective polarizers are orthogonal to each other on both sides of the liquid crystal layer 20.

As the second polarizing film 11, those described for the first polarizing film 1 can be used. The second polarizing film 11 to be used may be the same as or different from the first polarizing film 1.

For forming the second pressure-sensitive adhesive layer 12, the pressure-sensitive adhesive described for the first pressure-sensitive adhesive layer 2 can be used. The pressure-sensitive adhesive used for forming the second pressure-sensitive adhesive layer 12 may be the same as or different from the first pressure-sensitive adhesive layer 2. The thickness of the second pressure-sensitive adhesive layer 12 is not particularly limited, and is, for example, approximately from 1 to 100 μm, preferably from 2 to 50 μm, more preferably from 2 to 40 μm, and still more preferably from 5 to 35 μm.

In the in-cell type liquid crystal panel C, a conduction structure 51 or 50 can be provided on the side surfaces of at least one layer selected from the surface treatment layer 4, the anchor layer 3, and the first pressure-sensitive adhesive layer 2 of the pressure-sensitive adhesive layer attached polarizing film A. In FIG. 2, a case where the conduction structure 51 is provided in the side surface of the surface treatment layer 4 and the first polarizing film 1 is illustrated. In addition, a case where the conduction structure 50 is provided in the side surface of the anchor layer 3 and the pressure-sensitive adhesive layer 2 is illustrated. Moreover, in FIG. 2, the conduction structures 51 and 50 are provided and such conduction structure can be provided on the side surface of at least one layer selected from the surface treatment layer 4, the anchor layer 3, and the first pressure-sensitive adhesive layer 2 including an antistatic agent. For example, even in the case where the two layers include an antistatic agent, the conductive structure 51 may not be provided if the conductive structure 50 is provided when the two layers of the anchor layer 3 and the first pressure-sensitive adhesive layer 2 to which conductivity has been provided. The conduction structures 51 and 50 may be provided on the entire side surface of at least one layer selected from the surface treatment layer 4, the anchor layer 3 and the first pressure-sensitive adhesive layer 2 or may be provided on a part thereof. In the case where the conduction structure is provided in part, the conduction structure is provided in a proportion of preferably 1 area % or more, more preferably 3 area % or more, of the area of the side surface in order to ensure conduction on the side surface.

It is possible to suppress the occurrence of static electricity by connecting an electric potential to the other suitable portion from the side surface of at least one layer selected from the surface treatment layer 4, the anchor layer 3 and the first pressure-sensitive adhesive layer 2 by the conductive structures 51 and 50. As a material for forming the conduction structures 51 and 50, for example, a conductive paste such as silver paste, gold paste or other metal paste can be mentioned, and other conductive adhesives or any other suitable conductive materials can be used. The conduction structures 51 and 50 can also be formed in a linear shape extending from the side surface of at least one layer selected from the surface treatment layer 4, the anchor layer 3, and the first pressure-sensitive adhesive layer 2.

In addition, the first polarizing film 1 disposed on the viewing side of the liquid crystal layer 20, and the second polarizing film 11 disposed on the side opposite to the viewing side of the liquid crystal layer 20 can be used by laminating other optical films, depending on the suitability of each arrangement position. As the other optical film which may be used for forming a liquid crystal display device or the like, there are exemplified those capable of forming an optical film layer, such as a reflector, an anti-transmission plate, a retardation film (including wavelength plates such as ½ and ¼), a visual compensation film, and a brightness enhancement film. These can be used in one layer or in two or more layers.

(Liquid Crystal Display Device)

A liquid crystal display device with a built-in touch sensing function using the in-cell type liquid crystal panel C of the present invention can use appropriately members which form a liquid crystal display device, such as those using backlight or reflector for lighting system.

EXAMPLES

Although the present invention will be described in detail below based on Production Examples and Examples, it should be understood that the present invention is not limited to such Examples. The parts and percentages in each Example are on a weight basis. Room temperature standing conditions not specified below are all 23° C. and 65% RH.

<Measurement of Weight Average Molecular Weight of (Meth)Acrylic Polymer>

The weight average molecular weight (Mw) of the (meth) acrylic polymer was measured by GPC (gel permeation chromatography). The ratio Mw/Mn was also measured in the same manner.

Analyzer: HLC-8120 GPC, manufactured by Tosoh Corporation
Column: G7000H$_{XL}$+GMH$_{XL}$+GMH$_{XL}$, manufactured by Tosoh Corporation
Column size: 7.8 mmφ×30 cm each in total 90 cm
Column temperature: 40° C.
Flow rate: 0.8 mL/min
Injection volume: 100 μL
Eluent: Tetrahydrofuran
Detector: Differential refractometer (RI)
Standard sample: Polystyrene (Preparation of Polarizing Film)

An 80 μm-thick polyvinyl alcohol film was stretched between rolls each having a different speed ratio at a stretching ratio of 3 times, while being dyed in a 0.3% iodine solution at 30° C. for 1 minute. Then, the stretched film was further stretched to attain a total stretching ratio of 6 times while being immersed in an aqueous solution containing 4% boric acid and 10% potassium iodide at 60° C. for 0.5 minutes. Subsequently, the stretched film was washed by being immersed in an aqueous solution containing 1.5% potassium iodide at 30° C. for 10 seconds and then dried at 50° C. for 4 minutes to obtain a 30 μm-thick polarizer. A saponified triacetylcellulose film having a thickness of 80 μm was laminated on both sides of the polarizer with a polyvinyl alcohol-based adhesive to prepare a polarizing film.

<Formation of Surface Treatment Layer>

In Examples 1, 2, and 10, a dispersion of an ultraviolet curable resin containing ATO (antimony-doped tin oxide) particles (ASHC-101, manufactured by Sumitomo Osaka Cement Co., Ltd.) was applied, as a material for forming an antistatic hard coat layer, onto one side of the polarizing film obtained above with a wire bar in such a manner that the film thickness after drying became a thickness shown in Table 1 and was dried by heating at 80° C. for 1 minute to form a coating film. Subsequently, the coating film was irradiated with 300 mJ/cm$^2$ ultraviolet rays using a metal halide lamp and cured to form an antistatic hard coat layer (denoted as ASHC in Table 1).

On the other hand, in Examples 3 to 9 and 11 to 14 and Comparative Examples 1 and 2, hard coat layers containing no antistatic agent were formed. The coating solution for such hard coat layers which do not contain the antistatic agent were prepared by mixing 100 parts of an ultraviolet-curable acrylic resin (Unidic 17-806, manufactured by Dainippon Ink and Chemicals, Inc.), 3 parts of a photopolymerization initiator (Irgacure 184, manufactured by Ciba Specialty Chemicals Inc.), and 100 parts of toluene. The prepared solution was applied with a wire bar so as to have a thickness as shown in Table 1 after drying and then dried by heating at 80° C. for 1 minute to form a coating film. Subsequently, the coating film was irradiated with 300 mJ/cm$^2$ ultraviolet rays using a metal halide lamp and cured to form a hard coat layer (denoted as HC in Table 1).

(Preparation of Forming Material of Anchor Layer)

In Example 9, a solution containing 10 to 50% by weight of a thiophene-based polymer (8.6 parts, trade name: DENATRON P-580W, manufactured by Nagase ChemteX Corporation) as a solid content, 1 part of a solution containing an oxazoline group-containing acrylic polymer (trade name: EPOCROS WS-700, manufactured by Nippon Shokubai Co., Ltd.), and 90.4 parts of water were mixed to prepare a coating solution for forming an anchor layer having a solid content concentration of 0.5% by weight. The obtained coating solution for forming an anchor layer contained 0.04% by weight of the polythiophene-based polymer and 0.25% by weight of the oxazoline group-containing acrylic polymer.

(Formation of Anchor Layer)

The coating solution for forming an anchor layer was applied to one side (side on which no hard coat layer was provided) of the polarizing film such that the thickness after drying became a thickness shown in Table 1 and dried at 80° C. for 2 minutes to form an anchor layer. In the obtained anchor layer, the thiophene-based polymer and the oxazoline group-containing acrylic polymer were contained in 8% by weight and 50% by weight, respectively.

(Preparation of Acrylic Polymer)

A monomer mixture of 74.8 parts of butyl acrylate, 23 parts of phenoxyethyl acrylate, 0.5 parts of N-vinyl-2-pyrrolidone (NVP), 0.3 parts of acrylic acid, and 0.4 parts of 4-hydroxybutyl acrylate was charged into a four-necked flask equipped with a stirring blade, a thermometer, a nitrogen gas inlet tube and a condenser. Further, 0.1 parts of 2,2'-azobisisobutyronitrile as a polymerization initiator together with 100 parts of ethyl acetate were added to 100 parts (solid content) of the above monomer mixture, and nitrogen gas was introduced thereto with gentle stirring. After purging the inside of the flask with nitrogen gas, a polymerization reaction was carried out for 8 hours while keeping the liquid temperature in the flask at around 55° C. to prepare a solution of an acrylic polymer having a weight average molecular weight (Mw) of 1,600,000 and a ratio Mw/Mn of 3.7.

(Preparation of Pressure-Sensitive Adhesive Composition)

The ionic compound of Table 1 in an amount shown therein was blended with 100 parts of the solid content of the acrylic polymer solution obtained above. Further, 0.1 parts of an isocyanate crosslinking agent (TAKENATE D160N, trimethylolpropane hexamethylene diisocyanate, manufactured by Mitsui Chemicals, Inc.), 0.3 parts of benzoyl peroxide (NYPER BMT, manufactured by NOF CORPORATION), and 0.2 parts of γ-glycidoxypropylmethoxysilane (KBM-403, manufactured by Shin-Etsu Chemical Co., Ltd.) were blended thereto to prepare a solution of an acrylic pressure-sensitive adhesive composition.
(Formation of Pressure-Sensitive Adhesive Layer)

Next, the solution of the acrylic pressure-sensitive adhesive composition was applied onto one side of a polyethylene terephthalate film (separator film: MRF 38, manufactured by Mitsubishi Polyester Film Corp.) treated with a silicone-based release agent such that the pressure-sensitive adhesive layer after drying has a thickness shown in Table 1, and dried at 155° C. for 1 minute to forma pressure-sensitive adhesive layer on the surface of the separator film. The pressure-sensitive adhesive layer was transferred to a polarizing film on which an anchor layer was formed or to a polarizing film on which no anchor layer was formed.

Examples 1 to 14 and Comparative Examples 1 and 2

By the combination shown in Table 1, an anchor layer and a pressure-sensitive adhesive layer were sequentially famed on one side (side on which no hard coat layer was provided) of each of the polarizing films obtained above, thereby to prepare a pressure-sensitive adhesive layer attached polarizing film.

In Examples 1 to 8, 10, and 11 and Comparative Examples 1 and 2, the anchor layer was not formed. In Examples 1 and 2 and Comparative Example 1, no ionic compound was blended in preparation of the pressure-sensitive adhesive composition.

In Examples 13 and 14, after laminating the following surface protective film on the hard coat layer side of the obtained pressure-sensitive adhesive layer attached polarizing film, an antistatic layer was provided by peeling off the surface protective film.
<Preparation of Surface Protective Film>

A (meth)acrylic polymer (A) and a pressure-sensitive adhesive solution shown below were prepared, and a surface protective film was produced by the following method using the pressure-sensitive adhesive solution.
(Preparation of (Meth)Acrylic Polymer (A))

A four-necked flask equipped with a stirring blade, a thermometer, a nitrogen gas inlet tube, and a condenser was charged with 100 parts of 2-ethylhexyl acrylate (2EHA), 10 parts of 4-hydroxybutyl acrylate (4HBA), 0.02 parts of acrylic acid (AA), 0.2 parts of 2,2'-azobisisobutyronitrile as a polymerization initiator, and 157 parts of ethyl acetate, and nitrogen gas was introduced thereto with gentle stirring. A polymerization reaction was carried out for 6 hours while keeping the liquid temperature in the flask at around 65° C. to prepare a solution (40% by weight) of a (meth)acrylic polymer (A) having a weight average molecular weight of 540,000 and a glass transition temperature (Tg) of −67° C.
[Preparation of Pressure-Sensitive Adhesive Solution]

The (meth)acrylic polymer (A) solution (40%) was diluted to 20% with ethyl acetate. To 500 parts (solid content 100 parts) of the diluted solution were added 2 parts of a solution (solid content: 0.2 parts) of an organopolysiloxane having an oxyalkylene chain as a silicone component (KF-353, manufactured by Shin-Etsu Chemical Co., Ltd.) diluted to 10% with ethyl acetate, 15 parts (solid content: 0.15 parts) of a solution prepared by diluting lithium bis(trifluoromethane-sulfonyl)imide (LiN(CF$_3$SO$_2$)$_2$: LiTFSI, manufactured by Tokyo Chemical Industry Co., Ltd.) to 1% with ethyl acetate as an antistatic agent, i.e. an alkali metal salt (ionic compound), 1.75 parts by weight (solid content 1.75 parts by weight) of an isocyanurate of hexamethylene diisocyanate, which is a trifunctional isocyanate compound (Coronate HX, manufactured by Nippon Polyurethane Industry Co., Ltd.) as a crosslinking agent, 0.3 parts (solid content: 0.3 parts) of 1,3-bis(isocyanatomethyl)cyclohexane (TAKENATE 600, manufactured by Mitsui Chemicals, Inc.) which is a bifunctional isocyanate compound, and 2 parts (solid content: 0.02 parts) of dibutyltin dilaurate (1% ethyl acetate solution) as a crosslinking catalyst, and the resulting mixture was stirred to prepare an acrylic pressure-sensitive adhesive solution.
[Preparation of Antistatic-Treated Film]

An antistatic agent solution was prepared by diluting 10 parts of an antistatic agent (MICRO-SOLVER RMd-142 containing tin oxide and a polyester resin as main components, manufactured by Solvex Inc.) with a mixed solvent consisting of 30 parts of water and 70 parts of methanol.

The obtained antistatic agent solution was applied onto a polyethylene terephthalate (PET) film (thickness: 38 μm) using a Meyer bar and dried at 130° C. for 1 minute to remove the solvent to obtain an antistatic layer (thickness: 0.2 μm), thereby to prepare an antistatic-treated film.
[Preparation of Surface Protective Film (Pressure-Sensitive Adhesive Sheet)]

The above acrylic pressure-sensitive adhesive solution was applied to the surface opposite to the antistatic-treated surface of the antistatic-treated film and heated at 130° C. for 2 minutes to forma pressure-sensitive adhesive layer having a thickness of 15 μm. Subsequently, a silicone-treated surface of a polyethylene terephthalate film (thickness: 25 μm) that had been subjected to a silicone treatment on one side was laminated on the surface of the pressure-sensitive adhesive layer to prepare a surface protective film.

The following evaluations were performed about the pressure-sensitive adhesive layer attached polarizing films obtained by the Examples and Comparative Examples. The evaluation results are shown in Table 1.
<Surface Resistance (Q/D): Conductivity>

The surface resistance value was measured for each of the surface treatment layer, the anchor layer, and the pressure-sensitive adhesive layer.

The surface resistance value of the surface treatment layer was measured on the surface treatment layer of the pressure-sensitive adhesive layer attached polarizing film. The surface resistance value of the surface treatment layer in each of Examples 13 and 14 was measured after laminating—the surface protective film to the pressure-sensitive adhesive layer attached polarizing film, followed by peeling off.

The surface resistance value of the anchor layer was measured on the anchor layer side surface of the anchor layer attached polarizing film before forming the pressure-sensitive adhesive layer. When the anchor layer was not formed, the surface resistance value was measured on the surface of the polarizing film.

The surface resistance value of the pressure-sensitive adhesive layer was measured on the surface of the pressure-sensitive adhesive layer formed on the separator film.
<ESD Test>

A separator film was peeled off from a pressure-sensitive adhesive layer attached polarizing film and then the polarizing film was laminated to the viewing side of an in-cell type liquid crystal cell as shown in FIG. 2 or FIG. 3. Next, a silver paste having a width of 5 mm was applied to the side surface portion of the polarizing film thus laminated so as to cover each side surface portion of the hard coat layer, the polarizing film, the anchor layer, and the pressure-sensitive adhesive layer and connected to a ground electrode from the outside. The liquid crystal display device panel was set on a backlight device, and an electrostatic discharge gun was shot onto the polarizing film surface on the viewing side at an applied voltage of 10 kV, and the time until the disappearance of white voids due to electricity was measured. The judgement was made according to the following criteria. However, in Example 1, formation of a conduction structure using a silver paste was not carried out.

(Evaluation Criteria)

⊚⊚: The time until the disappearance of white voids is within 1 seconds.

⊚: The time until the disappearance of white voids is within 3 seconds.

○: The time until the disappearance of white voids is more than 3 seconds and within 5 seconds Δ: The time until the disappearance of white voids is more than 5 seconds and within 20 seconds.

x: The time until the disappearance of white voids is more than 20 seconds.

<TSP Sensitivity>

A lead wiring (not shown) at the peripheral portion of a transparent electrode pattern inside the in-cell type liquid crystal cell was connected to a controller IC (not shown), thereby to fabricate a liquid crystal display device with a built-in touch sensing function. In a state where the input display device of the liquid crystal display device with a built-in touch sensing function was used, visual observation was carried out to check the presence or absence of malfunction.

○: No malfunction occurred.

x: A malfunction occurred.

<Conduction Reliability: After ESD Humidification Test>

The in-cell type liquid crystal cell in which the silver paste was applied to the side surface of a polarizing film was treated for 500 hours in an atmosphere of 60° C./90% RH, and then an ESD test was performed.

TABLE 1

| | | Pressure-sensitive adhesive layer | | | | Anchor layer | | Surface treatment |
|---|---|---|---|---|---|---|---|---|
| | | | | Blending | | | | |
| | | Thickness (μm) | Kind of ionic compounds | amount of ionic compound (parts by weight) | Conductivity (surface resistance value Ω/□) | Thickness (μm) | Conductivity (surface resistance value Ω/□) | layer (hard coat layer) Thickness (μm) |
| Example | 1 | 23 | — | 0 | Immeasurable ($1.0 \times 10^{14}$ or more) | 0 | Immeasurable ($1.0 \times 10^{14}$ or more) | 3 |
| | 2 | 23 | — | 0 | Immeasurable ($1.0 \times 10^{14}$ or more) | 0 | Immeasurable ($1.0 \times 10^{14}$ or more) | 3 |
| | 3 | 23 | Li-TFSI | 1 | $4.3 \times 10^{10}$ | 0 | Immeasurable ($1.0 \times 10^{14}$ or more) | 5 |
| | 4 | 23 | Li-TFSI | 8 | $5.2 \times 10^{9}$ | 0 | Immeasurable ($1.0 \times 10^{14}$ or more) | 5 |
| | 5 | 23 | MPP-TFSI | 10 | $4.1 \times 10^{9}$ | 0 | Immeasurable ($1.0 \times 10^{14}$ or more) | 5 |
| | 6 | 23 | MPP-TFSI | 14 | $6.5 \times 10^{8}$ | 0 | Immeasurable ($1.0 \times 10^{14}$ or more) | 5 |
| | 7 | 23 | EMI-FSI | 10 | $4.8 \times 10^{8}$ | 0 | Immeasurable ($1.0 \times 10^{14}$ or more) | 5 |
| | 8 | 23 | EMP-TFSI | 14 | $3.9 \times 10^{9}$ | 0 | Immeasurable ($1.0 \times 10^{14}$ or more) | 5 |
| | 9 | 23 | Li-TFSI | 1 | $4.3 \times 10^{10}$ | 40 | $5.3 \times 10^{9}$ | 5 |
| | 10 | 23 | Li-TFSI | 8 | $5.2 \times 10^{9}$ | 0 | Immeasurable ($1.0 \times 10^{14}$ or more) | 3 |
| | 11 | 23 | EMI-FSI | 10 | $4.8 \times 10^{8}$ | 0 | Immeasurable ($1.0 \times 10^{14}$ or more) | 5 |
| | 12 | 23 | Li-TFSI | 1 | $4.3 \times 10^{10}$ | 40 | $5.3 \times 10^{9}$ | 5 |
| | 13 | 23 | — | 0 | Immeasurable ($1.0 \times 10^{14}$ or more) | 40 | $5.3 \times 10^{9}$ | 5 |
| | 14 | 23 | EMI-FSI | 7 | $1.2 \times 10^{9}$ | 80 | $6.2 \times 10^{8}$ | 5 |
| Comparative Example | 1 | 23 | — | 0 | Immeasurable ($1.0 \times 10^{14}$ or more) | 0 | Immeasurable ($1.0 \times 10^{14}$ or more) | 5 |
| | 2 | 23 | MPP-TFSI | 40 | $8.2 \times 10^{7}$ | 30 | Immeasurable ($1.0 \times 10^{14}$ or more) | 5 |

TABLE 1-continued

| | | Surface treatment layer (hard coat layer) | | Kind of evaluation panels | | Evaluation | | |
|---|---|---|---|---|---|---|---|---|
| | Kind | Transfer of antistatic agent by surface protective film | Conductivity (surface resistance value Ω/□) | Reference drawing | Side surface conduction (Ag paste) | TSP sensitivity | ESD | ESD after humidification test |
| Example 1 | ASHC | NO | $3.5 \times 10^8$ | FIG. 3 | NO | ○ | Δ | Δ |
| 2 | ASHC | NO | $3.5 \times 10^8$ | FIG. 3 | YES | ○ | ○ | Δ |
| 3 | HC | NO | Immeasurable ($1.0 \times 10^{14}$ or more) | FIG. 3 | YES | ○ | Δ | Δ |
| 4 | HC | NO | Immeasurable ($1.0 \times 10^{14}$ or more) | FIG. 3 | YES | ○ | ○ | ○ |
| 5 | HC | NO | Immeasurable ($1.0 \times 10^{14}$ or more) | FIG. 3 | YES | ○ | ⊙ | ⊙ |
| 6 | HC | NO | Immeasurable ($1.0 \times 10^{14}$ or more) | FIG. 3 | YES | ○ | ⊙ | ⊙ |
| 7 | HC | NO | Immeasurable ($1.0 \times 10^{14}$ or more) | FIG. 3 | YES | ○ | ⊙ | ⊙ |
| 8 | HC | NO | Immeasurable ($1.0 \times 10^{14}$ or more) | FIG. 3 | YES | ○ | ○ | ○ |
| 9 | HC | NO | Immeasurable ($1.0 \times 10^{14}$ or more) | FIG. 3 | YES | ○ | ○ | ○ |
| 10 | ASHC | NO | $3.5 \times 10^8$ | FIG. 3 | YES | ○ | ○ | ○ |
| 11 | HC | NO | Immeasurable ($1.0 \times 10^{14}$ or more) | FIG. 2 | YES | ○ | ⊙ | ⊙ |
| 12 | HC | NO | Immeasurable ($1.0 \times 10^{14}$ or more) | FIG. 2 | YES | ○ | ○ | ○ |
| 13 | HC | YES | $8.3 \times 10^{11}$ | FIG. 3 | YES | ○ | ⊙ | ○ |
| 14 | HC | YES | $8.3 \times 10^{11}$ | FIG. 3 | YES | ○ | ⊙⊙ | ⊙ |
| Comparative Example 1 | HC | NO | Immeasurable ($1.0 \times 10^{14}$ or more) | FIG. 3 | YES | ○ | X | X |
| 2 | HC | NO | Immeasurable ($1.0 \times 10^{14}$ or more) | FIG. 3 | YES | X | ⊙ | ⊙ |

In Table 1, Li-TFSI represents lithium bis(trifluoromethanesulfonyl)imide;

MPP-TFSI represents methylpropylpyrrolidinium bis(trifluoromethanesulfonyl)imide;

EMI-FSI represents 1-ethyl-3-methylimidazolium bis(fluorosulfonyl)imide; and

EMP-TFSI represents ethylmethylpyrrolidinium bis(trifluoromethanesulfonyl)imide.

A Pressure-sensitive adhesive layer attached polarizing film
B In-cell type liquid crystal cell
C In-cell type liquid crystal panel
1, 11 First and second polarizing films
2, 12 First and second pressure-sensitive adhesive layers
3 Anchor layer
4 Surface treatment layer
20 Liquid crystal layer
31 Touch sensor electrode
32 Touch driving electrode
33 Touch driving electrode and sensor electrode
41, 42 First and second transparent substrates

The invention claimed is:

1. An in-cell type liquid crystal panel comprising:
an in-cell type liquid crystal cell that is provided with a liquid crystal layer comprising liquid crystal molecules which are homogeneously aligned in the absence of an electric field, a first transparent substrate and a second transparent substrate sandwiching the liquid crystal layer on both sides, and a touch sensing electrode unit related to a touch sensor and a touch driving function between the first transparent substrate and the second transparent substrate; and a pressure-sensitive adhesive layer attached polarizing film that is disposed, via a first pressure-sensitive adhesive layer and without interposing a conductive layer, to the first transparent substrate side on a viewing side of the in-cell type liquid crystal cell, wherein:

the pressure-sensitive adhesive layer attached polarizing film comprises a surface treatment layer, a first polarizing film, an anchor layer, and the first pressure-sensitive adhesive layer in this order, at least one layer selected from among, the anchor layer, and the first pressure sensitive adhesive layer includes an antistatic agent, the anchor layer satisfies surface resistance values of $1 \times 10^8$ to $1 \times 10^{11} \Omega/\square_2$, wherein the first pressure-sensitive adhesive layer includes an alkali metal salt and/or an organic cation-anion salt as the antistatic agent, and a conduction structure is provided on a side surface of a layer including the antistatic agent among the anchor layer, and the first pressure-sensitive adhesive layer of the pressure-sensitive adhesive layer attached polarizing film.

2. The in-cell type liquid crystal panel according to claim 1, wherein the first pressure-sensitive adhesive layer satisfies surface resistance values of $1 \times 10^8$ to $1 \times 10^{11} \Omega/\square$.

3. The in-cell type liquid crystal panel according to claim 1, wherein the anchor layer, and the first pressure-sensitive adhesive layer include the antistatic agent.

4. The in-cell type liquid crystal panel according to claim 1, wherein the touch sensing electrode unit is disposed between the liquid crystal layer and the first transparent substrate or the second transparent substrate.

5. The in-cell type liquid crystal panel according to claim 4, wherein the touch sensing electrode unit is disposed between the liquid crystal layer and the first transparent substrate.

6. The in-cell type liquid crystal panel according to claim 4, wherein the touch sensing electrode unit is disposed between the liquid crystal layer and the second transparent substrate.

7. The in-cell type liquid crystal panel according to claim 4, wherein the touch sensing electrode unit of the in-cell type liquid crystal cell is an electrode in which a touch sensor electrode and a touch driving electrode are integrally formed.

8. The in-cell type liquid crystal panel according to claim 1, wherein the touch sensing electrode unit is formed of a touch sensor electrode and a touch driving electrode.

9. The in-cell type liquid crystal panel according to claim 1, comprising a second polarizing film disposed on the second transparent substrate side of the in-cell type liquid crystal cell via a second pressure-sensitive adhesive layer.

10. A liquid crystal display device comprising the in-cell type liquid crystal panel according to claim 9.

11. The in-cell type liquid crystal panel according to claim 1, wherein the first pressure-sensitive adhesive layer includes an alkali metal salt and an organic cation-anion salt as the antistatic agent.

* * * * *